(12) United States Patent
Kiwada et al.

(10) Patent No.: US 7,685,249 B2
(45) Date of Patent: Mar. 23, 2010

(54) IMAGE PROCESSING METHOD, IMAGE PROCESS SYSTEM, AND RELATED EQUIPMENT USED THEREIN INCLUDING PORTABLE TERMINAL, IMAGE FORMING DATA TRANSMITTING DEVICE AND IMAGE FORMING DEVICE, AS WELL AS IMAGE PROCESSING PROGRAM AND COMPUTER READABLE RECORDING MEDIUM THAT STORES SA

(75) Inventors: Masakatsu Kiwada, Osaka (JP); Makoto Sakka, Osaka (JP)

(73) Assignee: Minolta Co., Ltd., Osaka-shi (JP)

( * ) Notice: Subject to any disclaimer, the term of this patent is extended or adjusted under 35 U.S.C. 154(b) by 917 days.

(21) Appl. No.: 10/079,603

(22) Filed: Feb. 22, 2002

(65) Prior Publication Data

US 2002/0120875 A1 Aug. 29, 2002

(30) Foreign Application Priority Data

Feb. 23, 2001 (JP) .............................. 2001-049253

(51) Int. Cl.
*G06F 15/167* (2006.01)

(52) U.S. Cl. ........................ 709/213; 709/217; 709/220

(58) Field of Classification Search ................. 709/225, 709/245, 213, 217, 220; 713/9
See application file for complete search history.

(56) References Cited

U.S. PATENT DOCUMENTS 5,826,029 A  10/1998  Gore, Jr. et al.
6,317,837 B1 * 11/2001 Kenworthy ................... 726/11
6,631,453 B1 * 10/2003 Friday .......................... 711/163
7,000,001 B2 * 2/2006 Lazaridis ..................... 709/217

FOREIGN PATENT DOCUMENTS

| JP | 10-063601 | 3/1998 |
|----|-----------|--------|
| JP | 10-154118 | 6/1998 |
| JP | 11-146118 | 5/1999 |
| JP | 11-355498 | 12/1999 |
| JP | 2000-207145 | 7/2000 |

OTHER PUBLICATIONS

U.S. Appl. No. 09/961,363.

* cited by examiner

*Primary Examiner*—Vivek Srivastava
*Assistant Examiner*—Adnan Mirza
(74) *Attorney, Agent, or Firm*—Morrison & Foerster LLP

(57) ABSTRACT

The cellular phone 1a sends a printing request to the PC 2 using a protocol that is allowed to connect bi-directionally between an internal network and an external network at the firewalls 5a and 5b, the PC 2 uploads a printing job to the file server 4 using a protocol that is allowed to connect only from an internal network to an external network at the firewall 5a, and the printer 3a downloads the printing job to print from the file server 4 using a protocol that is allowed to connect only from an internal network to an external network at the firewall 5b. The present invention enables one to form images of files stored on an image forming data transmission device on a first intranet on an image forming device on a second intranet using a portable terminal and a file server on an external network.

24 Claims, 19 Drawing Sheets

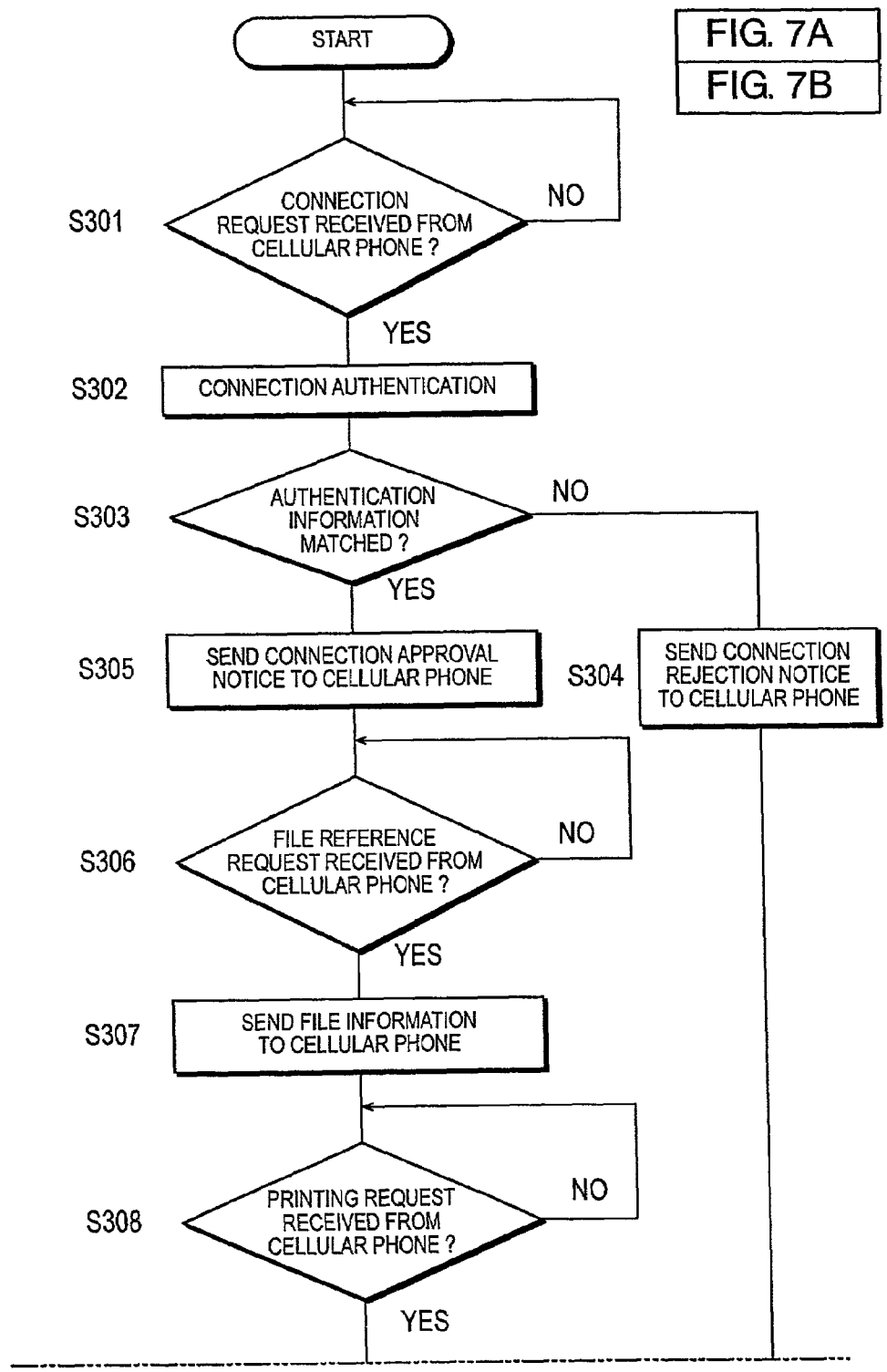

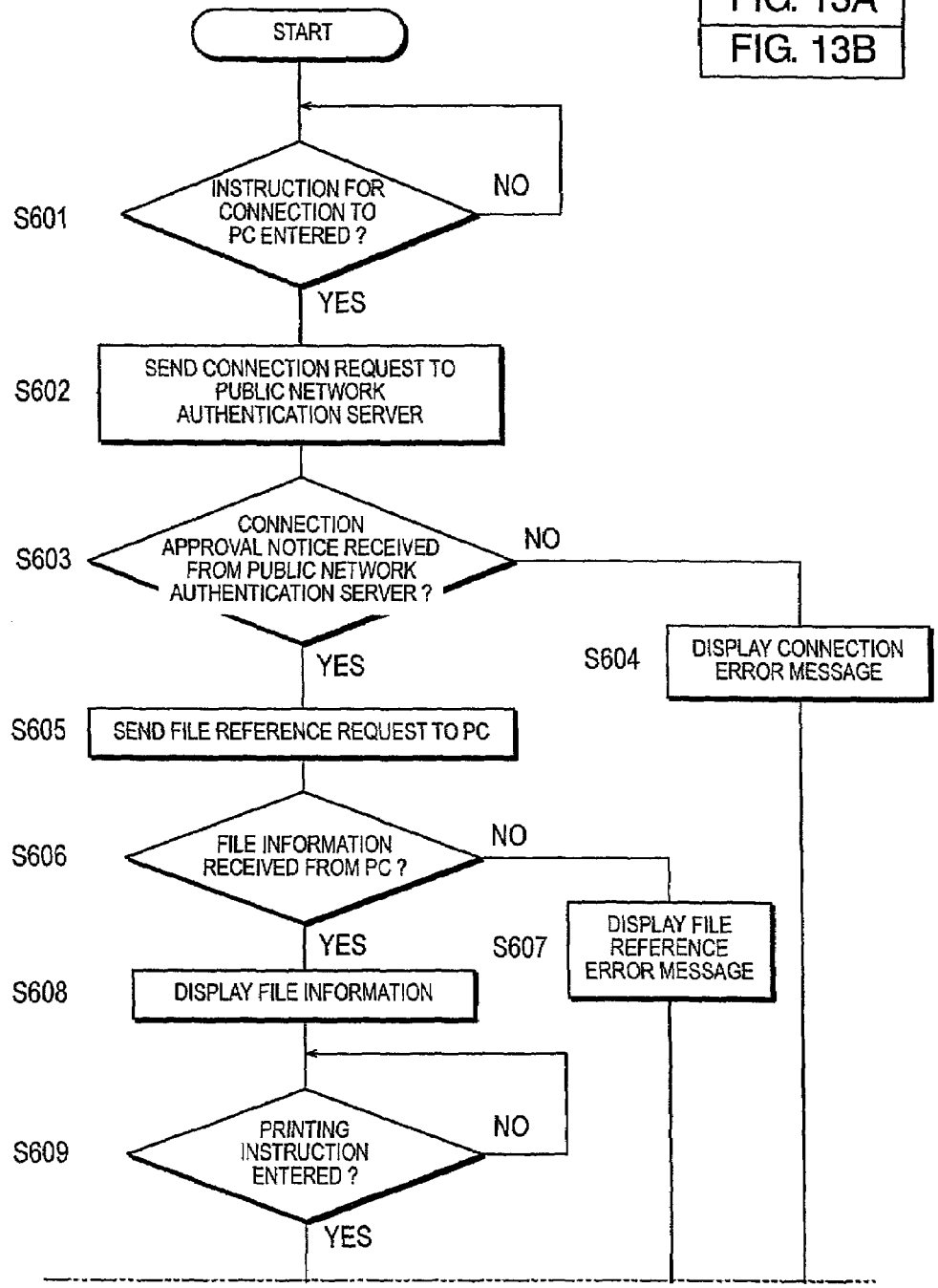

IMAGE PROCESSING METHOD, IMAGE PROCESS SYSTEM, AND RELATED EQUIPMENT USED THEREIN INCLUDING PORTABLE TERMINAL, IMAGE FORMING DATA TRANSMITTING DEVICE AND IMAGE FORMING DEVICE, AS WELL AS IMAGE PROCESSING PROGRAM AND COMPUTER READABLE RECORDING MEDIUM THAT STORES SA

This application is based on Japanese Patent Application No. 2001-49253 filed on Feb. 23, 2001, the contents of which are hereby incorporated by reference.

BACKGROUND OF THE INVENTION

1. Field of the Invention

The present invention relates to an image processing method and an image processing system that form images of files stored in an image forming data transmission device on a first intranet on an image forming device on a second intranet using a portable terminal and a file server on an external network.

2. Description of Related Art

As an example, there can be a situation where a person, who normally uses a personal computer ("PC") connected to an intranet X operating under an environment of the intranet X, goes on a business trip to an environment, which is under an intranet Y, and wishes to print out files stored in the person's PC connected to the intranet X with a printer or to view them on a monitor connected to the intranet Y at the trip's destination.

In such a case, although it is possible for the person to bring the files on the trip by storing them in advance in a recording medium such as a floppy disk, it requires an extra work for storing the files and it is impractical to bring all files the person may need on the trip, which makes the person impossible to cope with a situation where it is required to print files he didn't bring on the trip.

Under the situation, one possible method would be to transfer only those files desired to be printed from various files stored in the person's own PC to a printer via a network such as the Internet operating the person's own PC remotely, but such a transfer would not work due to the firewalls installed in the intranet X and the intranet Y.

SUMMARY OF THE INVENTION

The present invention is made in consideration of the abovementioned problem and its intention is to provide an image processing method and an image processing system that form images of files stored in an image forming data transmission device on a first intranet on an image forming device on a second intranet using a portable terminal and a file server on an external network without being hindered by firewalls.

The above intention is accomplished by an image processing method for forming images on an image forming device based on a file stored in an image forming data transmission device using a portable terminal, said image forming data transmission device connected to a first internal network constructed inside a first firewall, said image forming device connected to a second internal network constructed inside a second firewall, and a file server connected to an external network constructed on the outside of said first firewall and said second firewall, comprising:

a step (1) wherein said portable terminal establishes a connection with said image forming data transmission device via said second internal network, said second firewall, said external network, said first firewall and said first internal network using a protocol, which is allowed to make bi-directional connections between the internal network and the external network at said first firewall and said second firewall;

a step (2) wherein said portable terminal transmits an image forming request for said file stored in said image forming data transmission device to said image forming data transmission device;

a step (3) wherein said image forming data transmission device receives said image forming request transmitted by said portable terminal in the step (2) and prepares an image forming data for said file according to said image forming request;

a step (4) wherein said image forming data transmission device establishes a connection with said file server via said first internal network, said first firewall, and said external network using a protocol, which is allowed to make connections only from the internal network to the external network at said first firewall;

a step (5) wherein said image forming data transmission device uploads said image forming data prepared in the step (3) to said file server;

a step (6) wherein said image forming device establishes a connection with said file server via said second internal network, said second firewall, and said external network using a protocol, which is allowed to make connections only from the internal network to the external network at said second firewall;

a step (7) wherein said image forming device downloads said image forming data from said file server; and a step (8) wherein said image forming device forms said image based on said image forming data downloaded in the step (7).

The invention is also an image processing method for forming an image on an image forming device based on a file stored in an image forming data transmission device using a portable terminal, said image forming data transmission device connected to a first internal network constructed inside a first firewall, said image forming device connected to a second internal network constructed inside a second firewall, and a file server connected to an external network constructed on the outside of said first firewall and said second firewall, comprising:

a step (1) wherein said portable terminal establishes a connection with said image forming data transmission device via a public network, a public network authenticating server connected to said first internal network, and said first internal network;

a step (2) wherein said portable terminal transmits an image forming request for said file stored in said image forming data transmission device to said image forming data transmission device;

a step (3) wherein said image forming data transmission device receives said image forming request transmitted by said portable terminal in the step (2) and prepares an image forming data for said file according to said image forming request;

a step (4) wherein said image forming data transmission device establishes a connection with said file server via said first internal network, said first firewall, and said external network using a protocol, which is allowed to make connections only from the internal network to the external network at said first firewall;

a step (5) wherein said image forming data transmission device uploads said image forming data prepared in the step (3) to said file server;

a step (6) wherein said image forming device establishes a connection with said file server via said second internal network, said second firewall, and said external network using a protocol, which is allowed to make connections only from the internal network to the external network at said second firewall;

a step (7) wherein said image forming device downloads said image forming data from said file server; and a step (8) wherein said image forming device forms said image based on said image forming data downloaded in the step (7).

The invention is also an image processing system for forming an image on an image forming device based on a file stored in an image forming data transmission device, using a portable terminal, said image forming data transmission device connected to a first internal network constructed inside a first firewall, said image forming device connected to a second internal network constructed inside a second firewall, and a file server connected to an external network constructed on the outside of said first firewall and said second firewall, wherein said portable terminal comprises a connection establishing means for establishing a connection with said image forming data transmission device via said second internal network, said second firewall, said external network, said first firewall and said first internal network using a protocol, which is allowed to make bi-directional connections between the internal network and the external network at said first firewall and said second firewall, and an image forming request transmission means for transmitting an image forming request for said file stored in said image forming data transmission device to said image forming data transmission device;

said image forming data transmission device comprises an image forming request receiving means for receiving said image forming request from said portable terminal, an image forming data preparing means for preparing an image forming data for said file based on said image forming request received by said image forming request receiving means, a connection establishing means for establishing a connection with said file server via said first internal network, said first firewall, and said external network using a protocol, which is allowed to make connections only from the internal network to the external network at said first firewall, and an image forming data upload means for uploading said image forming data prepared by said image forming data preparing means to said file server; and said image forming device comprises a connection establishing means for establishing a connection with said file server via said second internal network, said second firewall, and said external network using a protocol, which is allowed to make connections only from the internal network to the external network at said second firewall, an image forming data download means for downloading said image forming data from said file server, and an image forming means for forming said image based on said image forming data downloaded by said image forming data download means.

The invention is also an image processing system for forming an image on an image forming device based on a file stored in an image forming data transmission device, using a portable terminal, said image forming data transmission device connected to a first internal network constructed inside a first firewall, said image forming device connected to a second internal network constructed inside a second firewall, and a file server connected to an external network constructed on the outside of said first firewall and said second firewall, wherein said portable terminal comprises a connection establishing means for establishing a connection with said image forming data transmission device via a public network, a public network authenticating server connected to said first internal network, and said first internal network, and an image forming request transmission means for transmitting an image forming request for said file stored in said image forming data transmission device to said image forming data transmission device;

said image forming data transmission device comprises an image forming request receiving means for receiving said image forming request from said portable terminal, an image forming data preparing means for preparing image forming data for said file based on said image forming request received by said image forming request receiving means, a connection establishing means for establishing a connection with said file server via said first internal network, said first firewall, and said external network using a protocol, which is allowed to make connections only from the internal network to the external network at said first firewall, and an image forming data upload means for uploading said image forming data prepared by said image forming data preparing means to said file server; and said image forming device comprises a connection establishing means for establishing a connection with said file server via said second internal network, said second firewall, and said external network using a protocol, which is allowed to make connections only from the internal network to the external network at said second firewall, an image forming data download means for downloading said image forming data from said file server, and an image forming means for forming said image based on said image forming data downloaded by said image forming data download means.

The invention is also a portable terminal for forming an image on an image forming device based on a file stored in an image forming data transmission device, using said portable terminal, said image forming data transmission device connected to a first internal network constructed inside a first firewall, said image forming device connected to a second internal network constructed inside a second firewall, and a file server connected to an external network constructed on the outside of said first firewall and said second firewall, comprising:

a connection establishing means for establishing a connection with said image forming data transmission device via said second internal network, said second firewall, said external network, said first firewall and said first internal network using a protocol, which is allowed to make bi-directional connections between the internal network and the external network at said first firewall and said second firewall; and an image forming request transmission means for transmitting an image forming request for said file stored in said image forming data transmission device to said image forming data transmission device.

The invention is also a portable terminal for forming an image on an image forming device based on a file stored in an image forming data transmission device, using said portable terminal, said image forming data transmission device connected to a first internal network constructed inside a first firewall, said image forming device connected to a second internal network constructed inside a second firewall, and a file server connected to an external network constructed on the outside of said first firewall and said second firewall, comprising:

a connection establishing means for establishing a connection with said image forming data transmission device via a public network, a public network authenticating server connected to said first internal network, and said first internal network; and an image forming request transmission means for transmitting an image forming request for said file stored in said image forming data transmission device to said image forming data transmission device.

The invention is also an image forming data transmission device for forming an image on an image forming device based on a file stored in said image forming data transmission device, using a portable terminal, said image forming data transmission device connected to a first internal network constructed inside a first firewall, said image forming device connected to a second internal network constructed inside a second firewall, and a file server connected to an external network constructed on the outside of said first firewall and said second firewall, comprising:

a file storage means for storing said file;

an image forming request receiving means for receiving an image forming request for said file stored in said file storage means from said portable terminal;

an image forming data preparing means from preparing an image forming data for said file based on said image forming request received by said image forming request receiving means;

a connection establishing means for establishing a connection with said file server via said first internal network, said first firewall, and said external network using a protocol, which is allowed to make connections only from the internal network to the external network at said first firewall; and an image forming data uploading means for uploading said image forming data prepared by said image forming data preparing means to said file server.

The invention is also an image forming device for forming an image on based on a file stored in an image forming data transmission device, using a portable terminal, said image forming data transmission device connected to a first internal network constructed inside a first firewall, said image forming device connected to a second internal network constructed inside a second firewall, and a file server connected to an external network constructed on the outside of said first firewall and said second firewall, comprising:

a connection establishing means for establishing a connection with said file server via said second internal network, said second firewall, and said external network using a protocol, which is allowed to make connections only from the internal network to the external network at said second firewall;

an image forming data download means for downloading from said file server an image forming data for said file uploaded by said image forming data transmission device to said file server; and an image forming means for forming said image based on said image forming data downloaded by said image forming data downloading means.

The invention is also a program to control a portable terminal for forming an image on an image forming device based on a file stored in an image forming data transmission device, using said portable terminal, said image forming data transmission device connected to a first internal network constructed inside a first firewall, said image forming device connected to a second internal network constructed inside a second firewall, and a file server connected to an external network constructed on the outside of said first firewall and said second firewall, characterized in causing said portable terminal to execute:

a step (1) of establishing a connection with said image forming data transmission device via said second internal network, said second firewall, said external network, said first firewall and said first internal network using a protocol, which is allowed to make bi-directional connections between the internal network and the external network at said first firewall and said second firewall, and a step (2) of transmitting an image forming request for said file stored in said image forming data transmission device to said image forming data transmission device.

The invention is also a program to control a portable terminal for forming an image on an image forming device based on a file stored in an image forming data transmission device, using said portable terminal, said image forming data transmission device connected to a first internal network constructed inside a first firewall, said image forming device connected to a second internal network constructed inside a second firewall, and a file server connected to an external network constructed on the outside of said first firewall and said second firewall, characterized in causing said portable terminal to execute:

a step (1) of establishing a connection with said image forming data transmission device via a public network, a public network authenticating server connected to said first internal network, and said first internal network, and a step (2) of transmitting an image forming request for said file stored in said image forming data transmission device to said image forming data transmission device.

The invention is also a program to control an image forming data transmission device for forming an image on an image forming device based on a file stored in said image forming data transmission device, using a portable terminal, said image forming data transmission device connected to a first internal network constructed inside a first firewall, said image forming device connected to a second internal network constructed inside a second firewall, and a file server connected to an external network constructed on the outside of said first firewall and said second firewall, characterized in causing said image forming data transmission device to execute:

a step (1) of receiving an image forming request for said file from said portable terminal;

a step (2) of preparing an image forming data for said file based on said image forming request received in the step (1);

a step (3) of establishing a connection with said file server via said first internal network, said first firewall, and said external network using a protocol, which is allowed to make connections only from the internal network to the external network at said first firewall; and a step (4) of uploading said image forming data prepared in the step (2) to said file server.

The invention is also a program to control an image forming device for forming an image based on a file stored in an image forming data transmission device, using a portable terminal, said image forming data transmission device connected to a first internal network constructed inside a first firewall, said image forming device connected to a second internal network constructed inside a second firewall, and a file server connected to an external network constructed on the outside of said first firewall and said second firewall, characterized in causing said image forming device to execute:

a step (1) of establishing a connection with said file server via said second internal network, said second firewall and said external network using a protocol, which is allowed to make connections only from the internal network to the external network at said second firewall;

a step (2) of downloading from said file server an image forming data for said file uploaded by said image forming data transmission device to said file server; and a step (3) of printing based on said image forming data downloaded in the step (2).

The invention is also a recording medium that stores said programs.

DESCRIPTION OF THE PREFERRED EMBODIMENTS

Preferred embodiments of the present invention will be described in the following.

Figure 1:
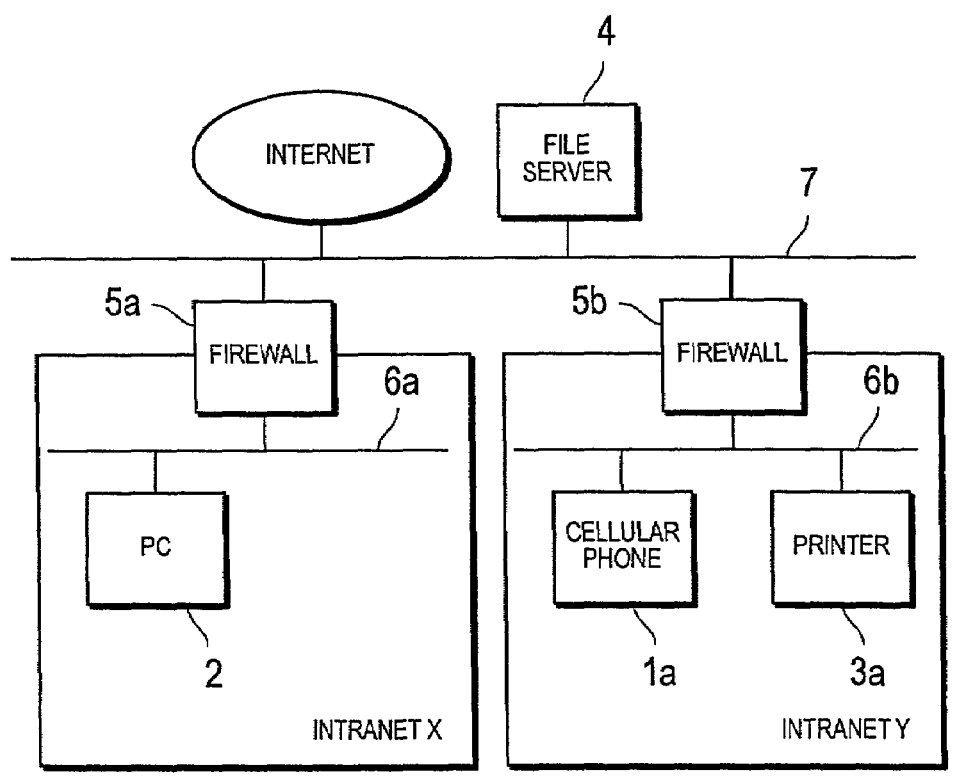
FIG. 1 is a block diagram showing the entire structure of an image processing system according to the first embodiment of the present invention.

FIG. 1 is a block diagram showing the entire structure of an image processing system according to a first embodiment of the present invention. The image processing system according to the present embodiment is equipped with a cellular phone 1a as a portable terminal, a personal computer ("PC") 2 as an image forming data transmitting device, a printer 3a as an image forming device, and a file server 4.

In FIG. 1, an internal network 6a is installed to constitute an intranet X inside a firewall 5a, and an internal network 6b is installed to constitute an intranet Y inside a firewall 5b. An external network 7 consisting of open networks including the Internet, etc., is installed on the outside of the firewall 5a and the firewall 5b. The cellular phone 1a is used being connected to the internal network 6b of the intranet Y in the present embodiment. The PC 2 is connected to the internal network 6a of the intranet X and the printer 3 is connected to the internal network 6b of the intranet Y. The file server 4 is connected to the external network 7. The present embodiment is intended to enable a user who is under the environment of the intranet Y to print a file stored in the PC 2 connected to the internal network 6a of the intranet X at a remote site on a printer 3a connected to the internal network 6b of the intranet Y using a cellular phone 1a.

In the description of the constitution of each of the various devices mentioned above, a device would be described only once when it first appears in order to avoid repetitive descriptions of the same.

Figure 2:
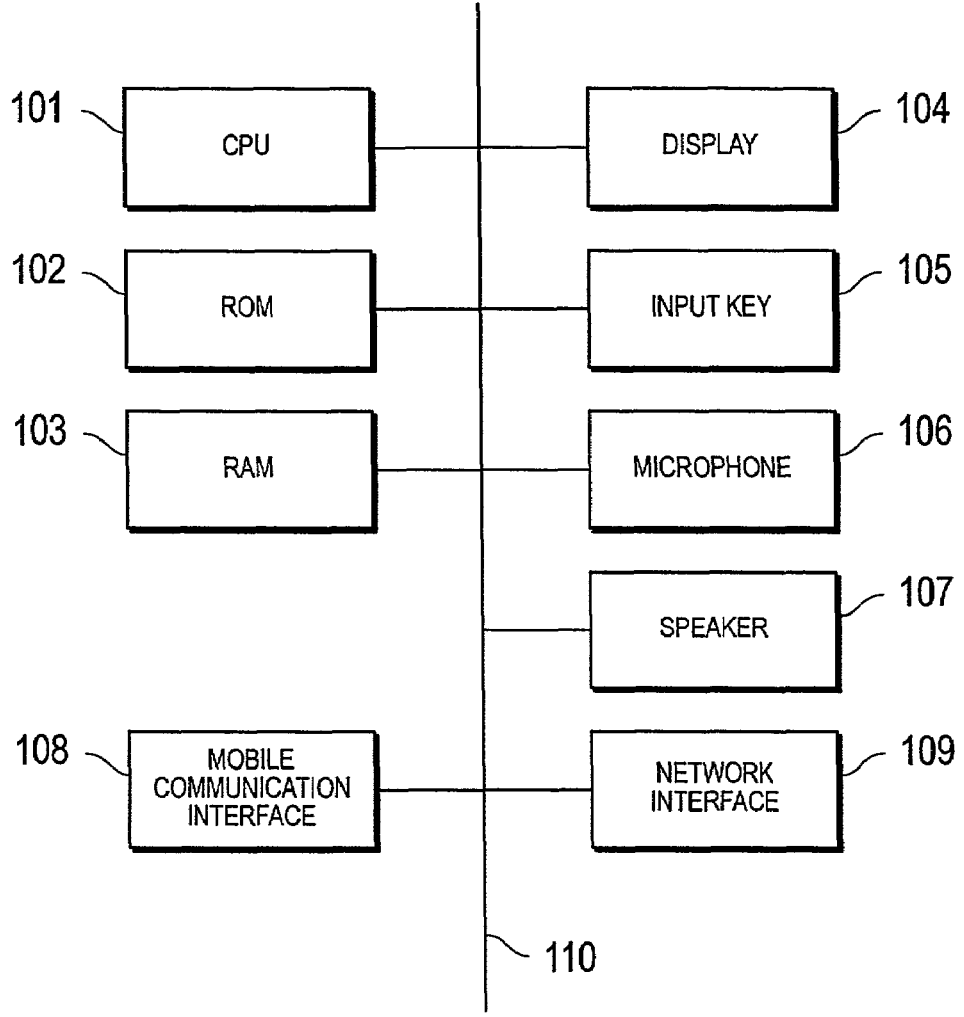
FIG. 2 is a block diagram showing an example constitution of a cellular phone 1a in FIG. 1.

FIG. 2 is a block diagram showing an example constitution of the cellular phone 1a in the present embodiment. In FIG. 2, the cellular phone 1a contains a CPU 101, a ROM 102, a RAM 103, a display 104, an input key 105, a microphone 106, a speaker 107, a mobile communication interface 108, a network interface 109, and a bus 110.

The CPU 101 is in charge of various control an arithmetic operations, the ROM 102 stores various programs, the RAM 103, as a working area, temporarily stores data. The display 104 is used for displaying information, the input key 105 for entering various inputs, the microphone 106 for voice input, and the speaker 107 for voice output. The mobile communication interface 108 is connected to a mobile communication network to server as an interface for conducting mobile communication using radio waves of a specified frequency band, while the network interface 109 is connected to a network to serve as an interface to communicate with other equipment on the network. All of the devices mentioned in the above are interconnected through the bus 110 for exchanging signals with each other.

In the present embodiment, the cellular phone 1a performs certain operations to be discussed later and the program that controls the cellular phone 1a for that purpose is stored in the ROM 102.

The network interface 109 includes both wired communications through cables and wireless communications using radio waves and infrared rays; in the latter case, the wireless communication standards, such as, Bluetooth, IEEE802.11, Home RF, IrDA, etc., are also applicable. Although it is not shown in the diagram, an interface device is provided on the internal network 6b that corresponds to the network interface 109, and the cellular phone 1a should be ready to exchange communications with equipment on the internal network 6b via the network interface 109 and said interface device as a preparation for the printing process in the present embodiment.

Figure 3:
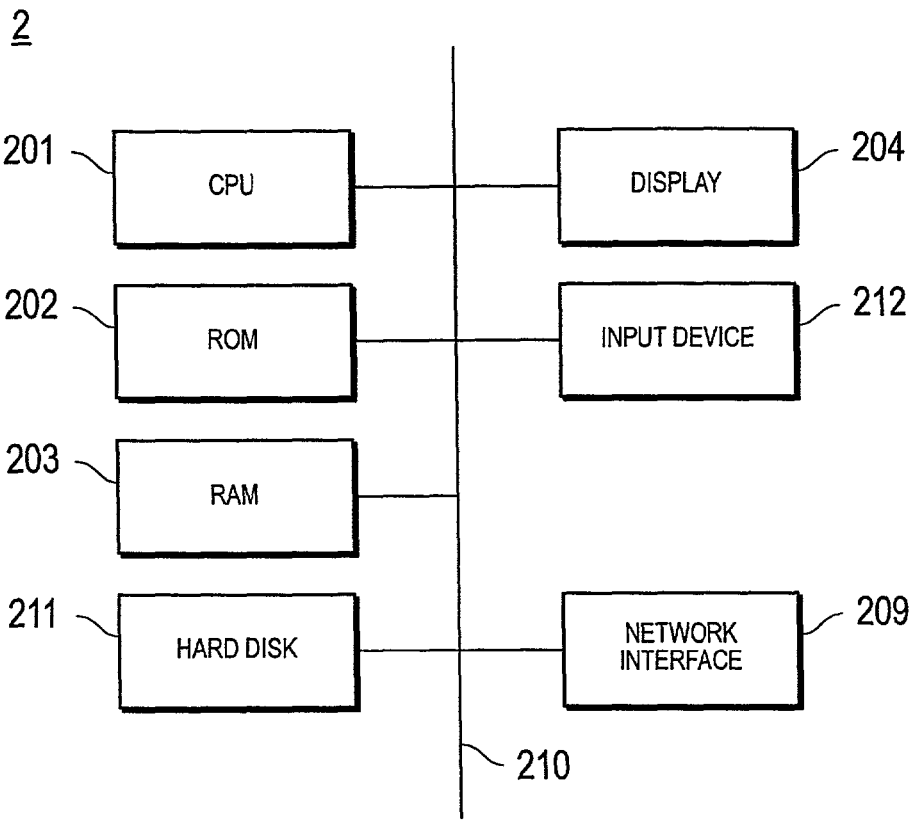
FIG. 3 is a block diagram showing an example constitution of a personal computer 2 in FIG. 1.

FIG. 3 is a block diagram showing an example constitution of the PC 2 in the present embodiment. In FIG. 3, the PC 2 contains a CPU 201, a ROM 202, a RAM 203, a hard disk 211, a display 204, an input device 212, a network interface 209, and a bus 210.

The hard disk 211 stores programs and data, and the input device 212 is used for inputting various inputting operations through a keyboard, a mouse, etc.

In the present embodiment, the PC 2 performs certain operations to be described later and the program that controls the PC 2 for that purpose is stored in the ROM 202 or the hard disk 211.

Figure 4:
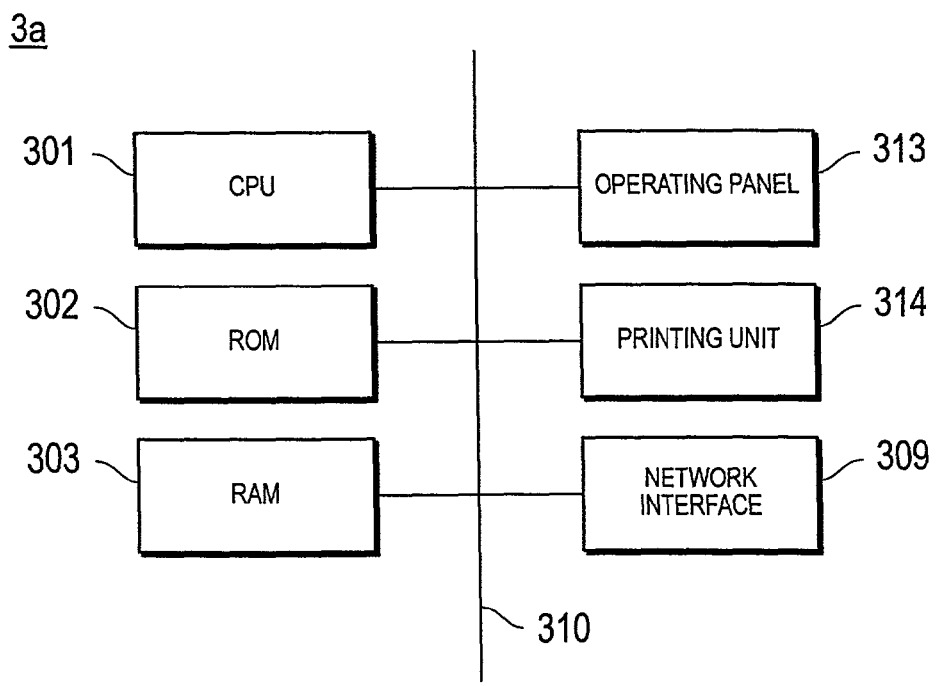
FIG. 4 is a block diagram showing an example constitution of a personal computer 3a in FIG. 1.

FIG. 4 is a block diagram showing an example constitution of the printer 3a in the present embodiment. In FIG. 4, the printer 3a contains a CPU 301, a ROM 302, a RAM 303, an operating panel 313, a printing unit 314, a network interface 309, and a bus 310.

The operating panel unit 313 consists of a touch panel, fixed keys outside the touch panel, display lamps, etc., and is used for various inputting operations and displays. The printing unit 314 performs printing based on the printing job.

In the present embodiment, the printer 3a performs certain operations to be described later and the program that controls the printer 3a for that purpose is stored in the ROM 302.

The file server 4 is a computer capable of file storage and transfer and is capable of using an open server connected to the external network 7. The open server is normally installed on a LAN called barrier segment (demilitarized zone or DMZ) built on the outside of the firewalls 5a and 5b, but the firewalls that can be used in the present embodiment is not limited such a kind.

The firewalls 5a and 5b are computers or dedicated hardware that are capable of controlling and limiting the access between the internal network and the external network. A firewall is normally provided with a port that is capable of connection only from the internal network to the external network and a port that is capable of bi-directional connection between the external network and the internal network, and a port to be used is predetermined for each protocol used for communication. HTTP, FTP and the like are used as a protocol for using a port specified for only the connection from the internal network to the external network, while SMTP and the like are used for a port specified for bi-directional connection between the external network and the internal network. In the present embodiment, each of the devices mentioned above uses these protocols selectively to conduct specific communications to be described later.

The internal network 6a and 6b are either LANs such as Ethernet®, TokenRing, and FDDI, or WANs consisting of these LANs connected by dedicated lines. The types of these devices and the total number of them on the internal networks 6a and 6b are not limited to the example shown in FIG. 1.

The external network 7 is a network built on the outside of the firewalls 5a and 5b and includes the abovementioned barrier segments and open networks such as the Internet.

Figure 5:
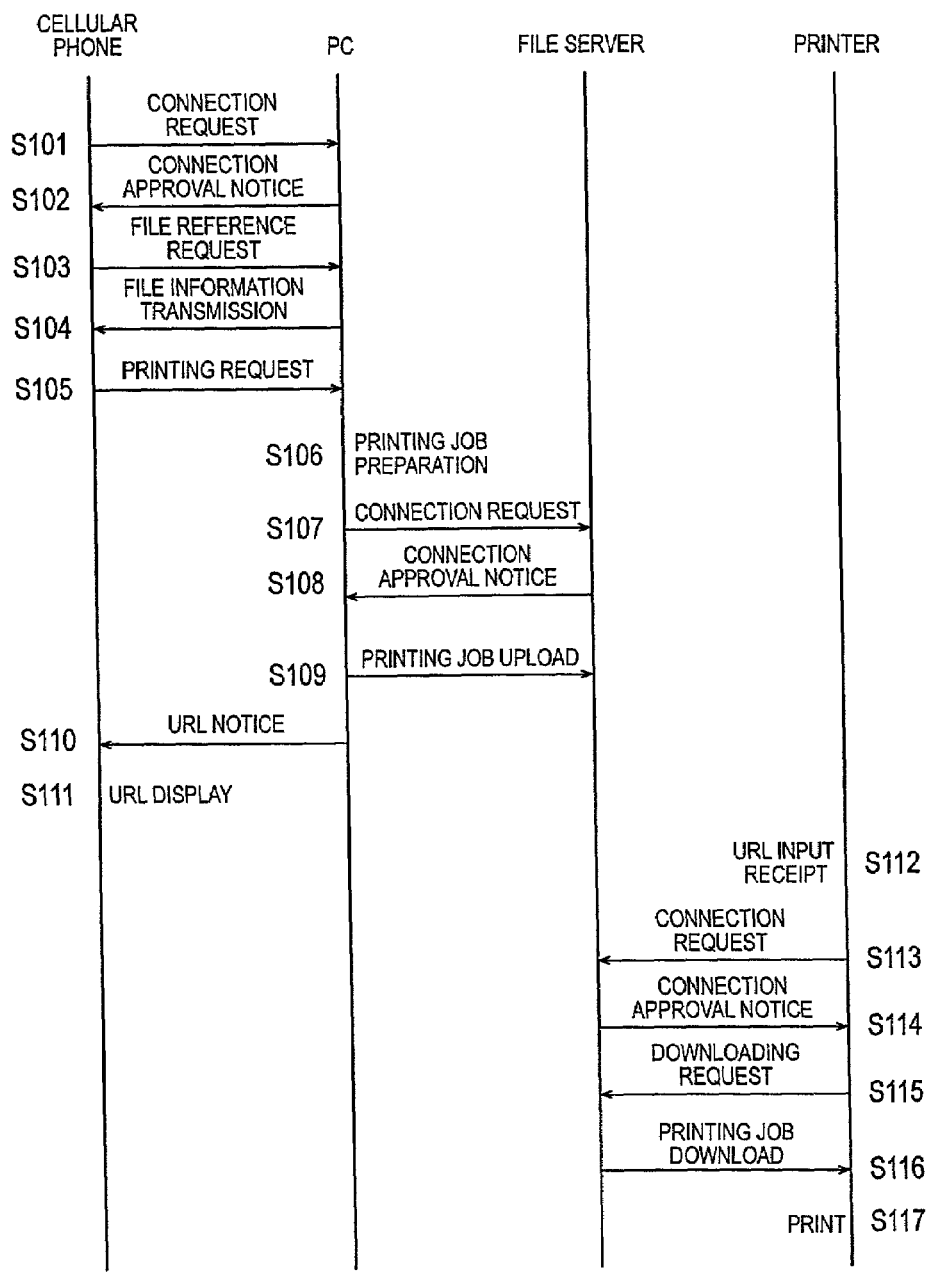
FIG. 5 is a sequence chart showing the printing procedure of a printing system in FIG. 1.

Next, the outline of the operation of the image processing system in the present embodiment will be described. FIG. 5 is a sequence chart showing the printing process of the image processing system in the present embodiment.

First, when a connection instruction is received, the cellular phone 1a sends a connection request to the PC 2 (S101) and receives a connection approval notice from the PC 2 (S102), thus establishing the connection from the cellular phone 1a to the PC 2. The connection from the cellular phone 1a to the PC 2 is made using a protocol that is allowed to make bi-directional connections between the internal network and the external network at the firewall 5a and 5b. This makes it possible for the cellular phone 1a to establish connections with the PC 2 via the internal network 6b, said port of the firewall 5b, the external network 7, said port of the firewall 5a, and the internal network 6a.

When the connection between the cellular phone 1a and the PC 2 is established, the cellular phone 1a sends a file reference request to the PC 2 (S103) and receives the file information from the PC 2 (S104), thus obtaining the information about printable files stored on the hard disk 211 of the PC 2. Next, the cellular phone 1a sends the printing request of the specified file based on the user's printing instruction to the PC 2 (S105).

The PC 2 generates the printing job of the specified file based on the received printing instruction (S106).

Next, the PC 2 sends a connection request to the file server 4 (S107) and receives a connection approval notice from the file server 4 (S108), thus establishing the connection from the PC 2 to the file server 4. The connection from the PC 2 to the file server 4 is made using a protocol that is allowed to make connections only from the internal network to the external network at the firewall 5a. This makes it possible for the PC 2 to establish connections with the file server 4 via the internal network 6a, said port of the firewall 5a, and the external network 7.

As the connection from the PC2 to the file server 4 is established, the PC 2 uploads the generated printing job to the file server 4 (S109). When the uploading is completed, the PC 2 notifies the cellular phone 1a of the uploading destination URL as the data indicating the storage location of the uploaded printing job on the file server 4 (S110). The cellular phone 1a displays the received URL on the display 104 (S111).

As the printer 3a receives said URL input from the user (S112), it sends a connection request to the file server 4 (S113) and receives a connection approval notice from the file server 4 (S114), thus establishing a connection from the printer 3a to the file server 4. The connection from the printer 3a to the file server 4 is made using a protocol that is allowed to make connections only from the internal network to the external network at the firewall 5b. This makes it possible for the printer 3a to establish connections with the file server 4 via the internal network 6b, said port of the firewall 5b, and the external network 7.

When the connection from the printer 3a to the file server 4 is established, the printer 3a sends a download request of said printing job to the file server 4 based on said URL (S115), and downloads said printing job stored in the file server 4 (S116). Next, the printer 3a executes the printing process based on the downloaded printing job (S117).

Next, the operations of the cellular phone 1a, the PC 2, and the printer 3a in the present embodiment will be described in detail.

Figure 6A:
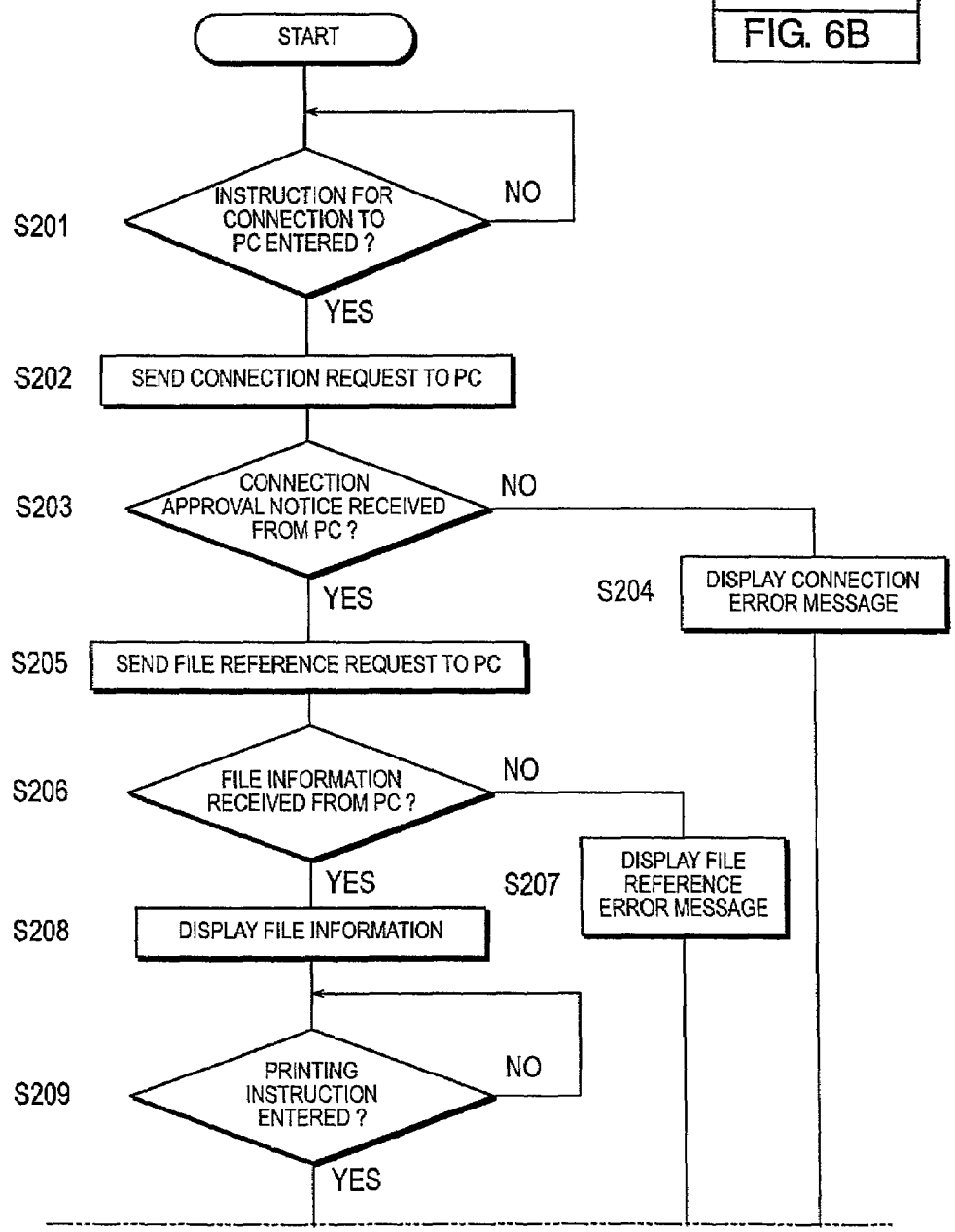
FIG. 6 is a flowchart showing the printing procedure of the cellular phone 1a in FIG. 1.
Figure 6B:
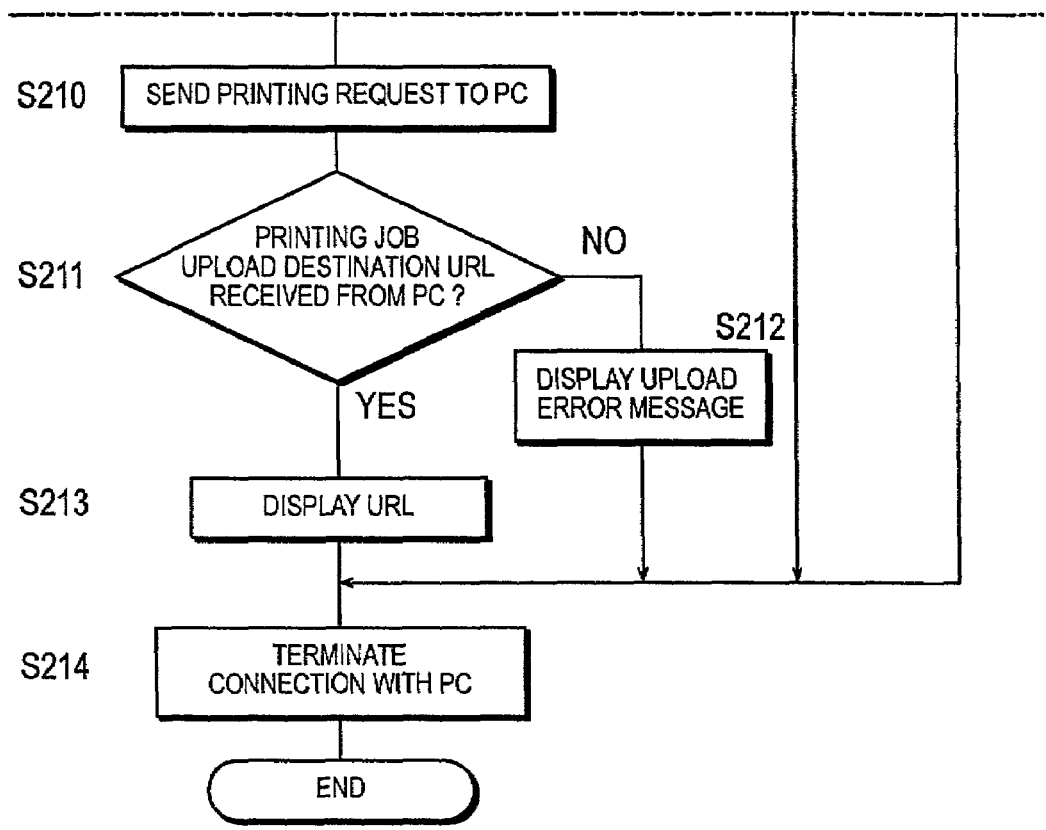

FIG. 6 is a flowchart showing the procedure of the printing process of the cellular phone 1a in the present embodiment. First, the cellular phone 1a goes on stand-by until the PC 2 receives a connection request from the user (S201: No). The user enters said connection instruction with the input key 105. Said connection instruction includes authentication information required for authenticating the connection to the PC 2, such as the user's account, ID, password, host name of the PC being connected to, domain name, IP address, and cellular phone number. However, it is also possible to store said authentication information in the ROM 102 of the cellular phone 1a in advance and use the information by reading it out when a connection instruction is received from the user instead of including the information in said connection instruction.

When the cellular phone 1a receives an instruction for connection to the PC 2 from the user (S201: Yes), it sends a connection request to the PC 2 (S202). Said connection request includes said authentication information. Connections from the cellular phone 1a to the PC 2 is made using a protocol, e.g., SMTP, that is allowed to make bi-directional connections between the internal network and the external network at the firewalls 5a and 5b.

If it fails to receive a connection approval notice from the PC 2 such that there is no response from the PC 2 within a specified time after sending said connection request or that a connection rejection notice is received from the PC 2 (S203: No), a connection error message will be displayed on the display 104 (S204) and the attempt of connecting with the PC 2 will be terminated (S214). If a connection approval notice is received from the PC 2 (S203: Yes), a file reference request will be sent out in order to make reference to the files stored in the hard disk 211 of the PC 2 (S205).

If it fails to receive the file information from the PC 2 such that a response is not received from the PC 2 within a specified time after a file reference request is made (S206: No), a file reference error message will be displayed on the display 104 (S207), and the connection with the PC 2 will be terminated (S214). When file information is received from the PC 2 (S206: Yes), the received file information will be displayed on the display 104 (S208). Said file information includes the file names, directory structure, etc., of the files stored in the hard disk 211 of the PC 2.

Next, the cellular phone 1a will be on stand-by until the printing instruction is received from the user (S209: No). The user enters said printing instruction operating the input key 105. Said printing instruction includes, in addition to the instruction specifying the file to be printed, information concerning various printing conditions such as number of copies, paper size, scale, density, printing orientation, layout (laying out N pages of data on one page, i.e., (N in 1), etc.), single or double side printing, sorting, and finishing features (stapling, folding, hole punching, etc.).

When a printing instruction is received from the user (S209: Yes), a printing request will be sent to the PC 2 (S210). Such printing request includes information such as identification of the file to be printed and printing conditions as mentioned above.

If it fails to receive the URL of the uploading destination of the printer job from the PC 2 to the file server 4 such that a response is not received from the PC 2 within a specified time after a printing request is made or that a printing job upload error notice is received (S211: No), a printing job upload error message will be displayed on the display 104 (S212), and the connection with the PC 2 will be terminated (S214). When the URL of the uploading destination of the printer job from the PC 2 to the file server 4 is received from the PC 2 (S211: Yes), the received URL will be displayed on the display 104 (S213), and the connection with the PC 2 will be terminated (S214).

Figure 7B:
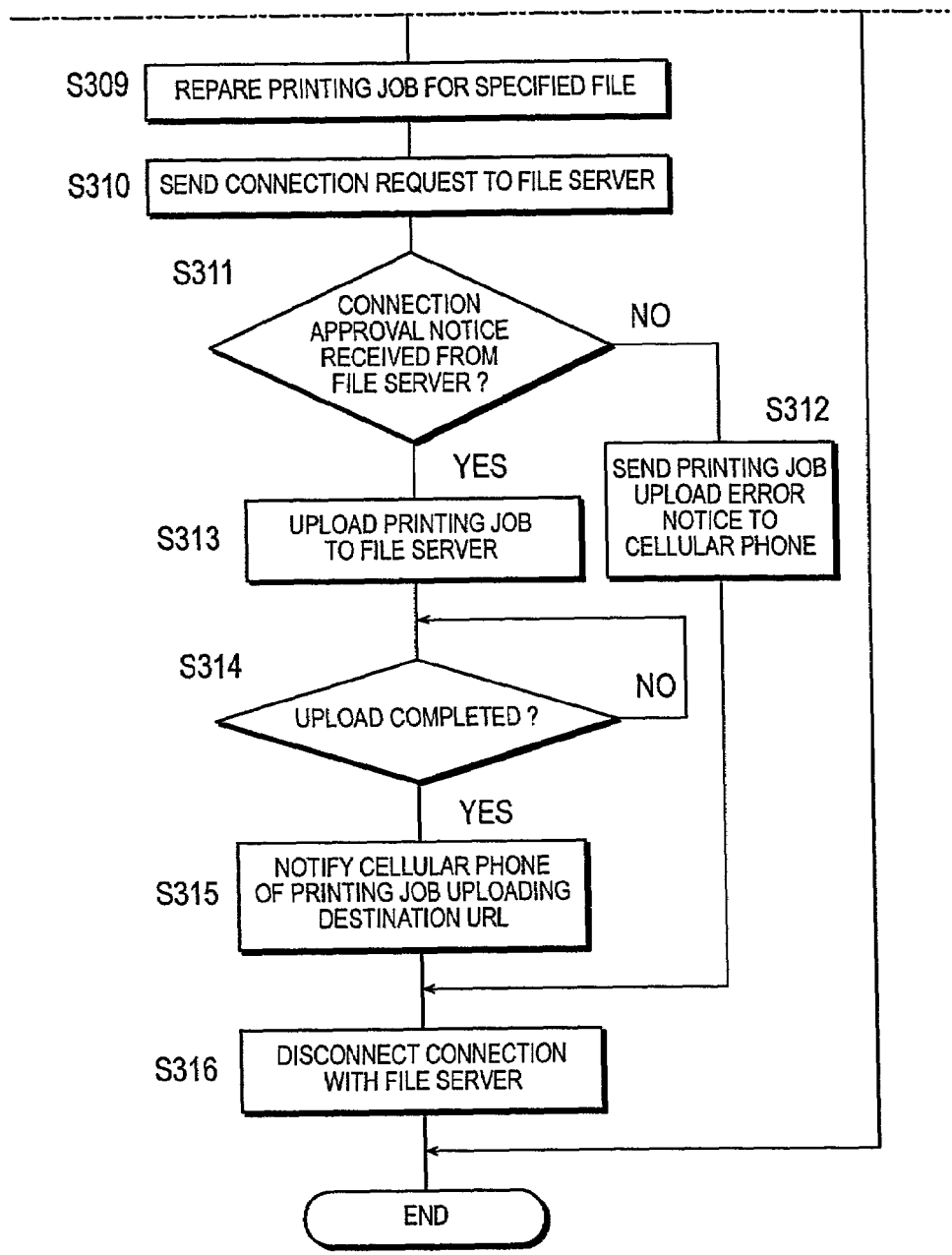
FIG. 7 is a flowchart showing the printing procedure of the personal computer 2 in FIG. 1.

FIG. 7 is a flowchart showing the printing procedure of the personal computer 2 in the present embodiment. First, the PC 2 goes on stand-by until it receives a connection request from the cellular phone 1a (S301: No). When it receives a connection request from the cellular phone 1a (S301: Yes), it conducts a connection authentication process based on the authentication information contained in the received connection request (S302). Said connection authentication process is conducted by collating the received authentication information with the authentication information stored in advance in the hard disk 211. If the authentication information does not match (S303: No), a connection rejection notice will be sent to the cellular phone (S304); however, if the authentication information matches (S303: Yes), a connection approval notice will be sent to the cellular phone 1a (S305).

Next, the PC 2 goes on stand-by until a file reference request is received from the cellular phone 1a (S306: No). When it receives a file reference request from the cellular phone 1a (S306: Yes), it prepares file information containing the names of the files of all the files stored in the hard disk for which printing jobs can be prepared as well as the structures of the directories where said files are stored, and sends said file information to the cellular phone 1a (S307).

Next, the PC 2 goes on stand-by until a printing request is received from the cellular phone 1a (S308: No). When it receives a printing request from the cellular phone 1a (S308: Yes), it prepares a printing job for the file specified in the received printing request (S309). Said printing job contains printing data obtained by converting the file to a data format understood by the printer and printing conditions that are required for printing said printing data on the printer. The data format understood by the printer is, for example, a control language such as a page description language, the use of which enables the printer that receives said print job to understand the control language and prepare a printing image (bitmap data). Moreover, the printing job includes the prepared bitmap data as printing data if the PC is preparing the printing image directly; further, if the printer can understand the file directly, the printing job can include the unconverted file as printing data. These printing job preparation processes, in other words, the conversion of the file into a control language format or bit map data, setting up of the printing conditions, etc., are conducted by the printer driver stored on the hard disk 211.

After the printing job is prepared, a connection request is sent to the file server 4 (S310). The connection of the PC 2 to the file server 4 is conducted here, as described above, using a protocol that is allowed to connect only from the internal network to the external network at the firewall 5a, for example, FTP and HTTP.

If it fails to receive a connection approval notice from the file server 4 such that there is no response from the file server 4 within a specified time after sending said connection request or that a connection rejection notice is received from the file server 4 (S311: No), a printing job upload error notice will be sent to the cellular phone 1a (S312), and the attempt of connecting with the file server 4 will be terminated (S316). If a connection approval notice is received from the file server 4 (S311: Yes), the prepared printing job will be uploaded to the file server 4 (S313).

When the uploading of the printing job to the file server 4 is completed (S314: Yes), the URL of the uploading destination will be sent to the cellular phone 1a (S315), and the connection with the file server 4 will be terminated (S316).

Figure 8:
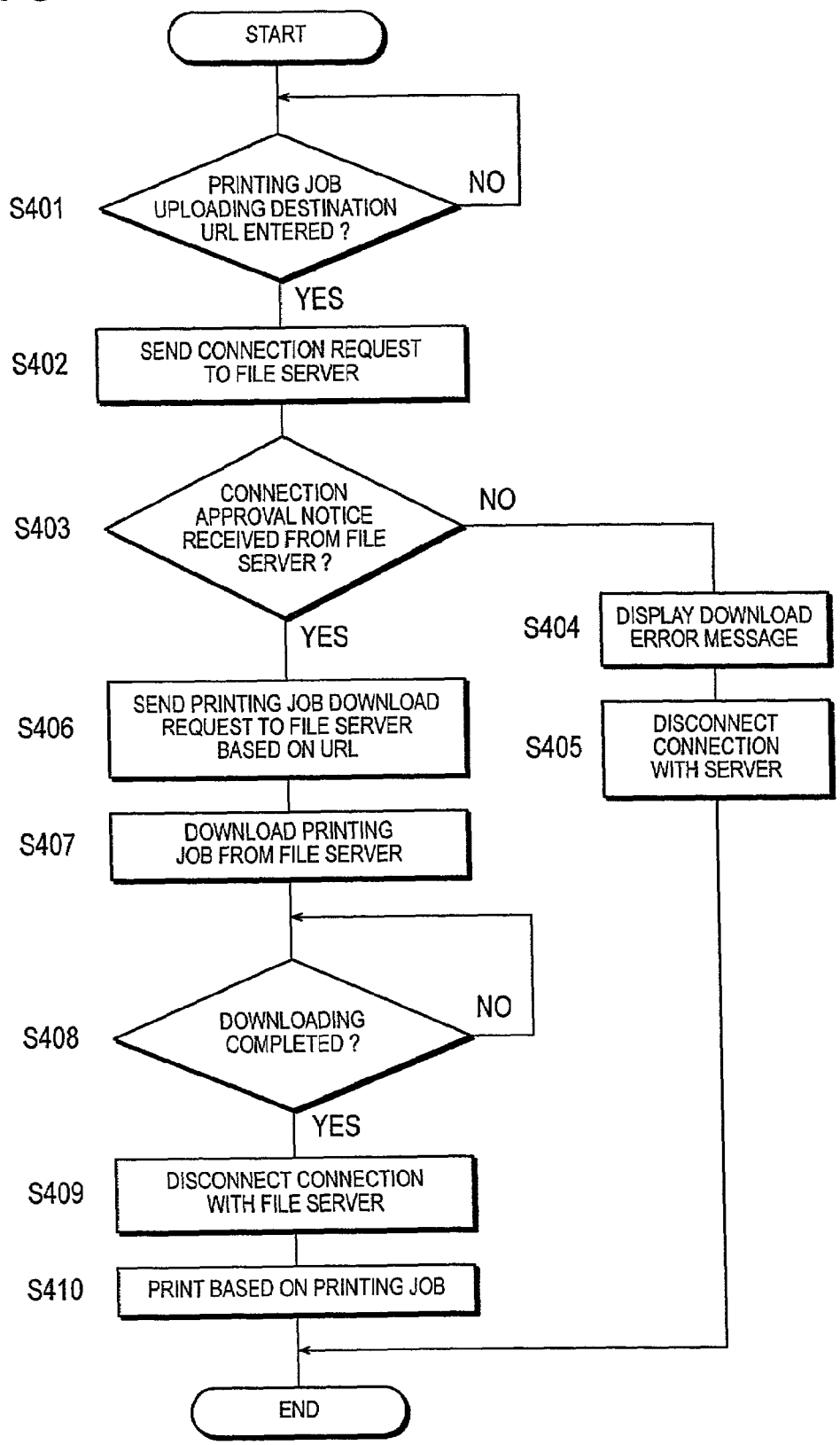
FIG. 8 is a flowchart showing the operation of the printer 3a in FIG. 1.

FIG. 8 is a flowchart showing the operation of the printer 3a in the present embodiment. First, the printer 3a goes on stand-by until it receives a URL of the printing job uploading destination from the user (S401: No). The user enters said URL operating the operating panel 313. When the URL of the printing job uploading destination is received from the user (S401: Yes), a connection request is sent to the file server 4 (S402). The connection of the printer 3a to the file server 4 is conducted here, as described above, using a protocol that is allowed to connect only from the internal network to the external network at the firewall 5b, for example, FTP and HTTP.

If it fails to receive a connection approval notice from the file server 4 such that there is no response from the file server 4 within a specified time after sending said connection request or that a connection rejection notice is received from the file server 4 (S403: No), a printing job upload error notice will be displayed on the operating panel 313 (S404), and the attempt of connecting with the file server 4 will be terminated (S405). If a connection approval notice is received from the file server 4 (S403: Yes), said printing job download request will be sent to the file server based on said URL (S406), and the prepared printing job will be downloaded from the directory on the file server 4 where said printing job is stored as indicated by said URL (S407).

When the downloading of the printing job to the file server 4 is completed (S408: Yes), the connection with the file server 4 will be terminated (S409) and the printing process will be executed based on the downloaded printing job (S410). The printer 3a conducts image forming using the printing data contained in the downloaded printing job if it is bitmap data, or after rasterization, if it is written in the control language or an unprocessed file and according to the accompanying printing condition.

Figure 9:
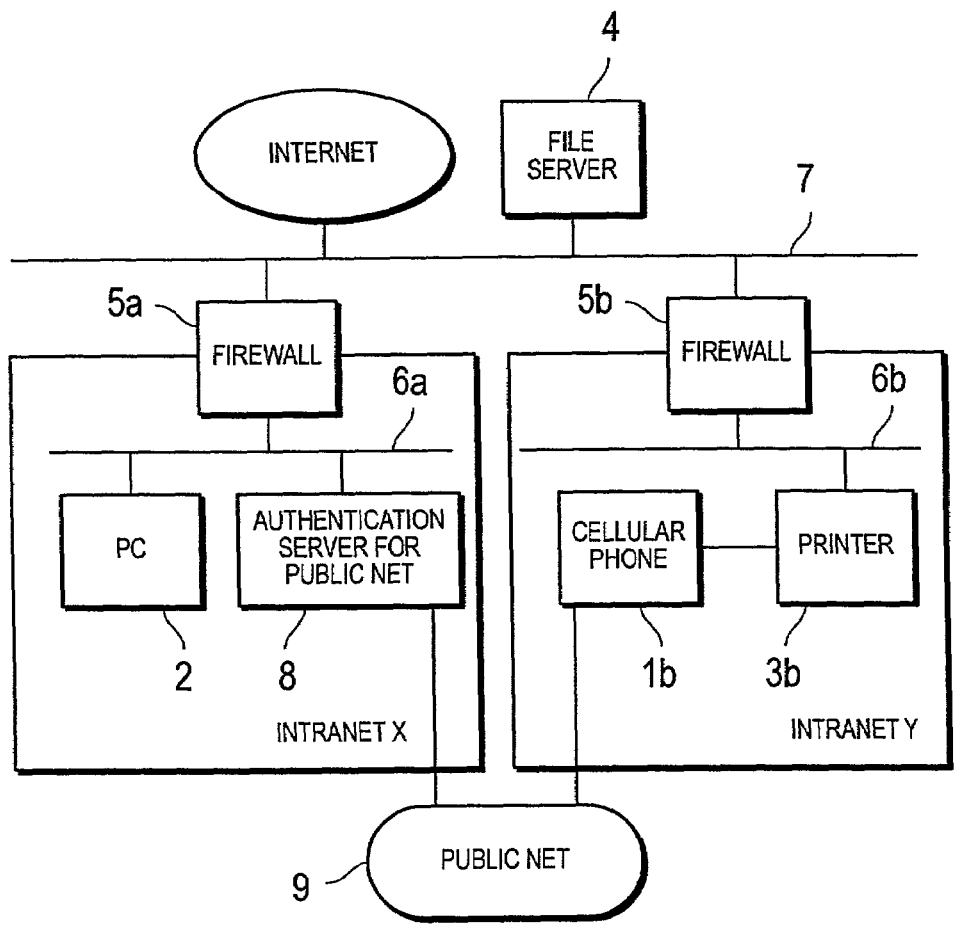
FIG. 9 is a block diagram showing the entire structure of an image processing system according to the second embodiment of the present invention.

FIG. 9 is a block diagram showing the entire structure of an image processing system according to the second embodiment of the present invention. The image processing system according to the present embodiment is equipped with a cellular phone 1b as a portable terminal, the personal computer ("PC") 2 as an image forming data transmitting device, a printer 3b as an image forming device, and a file server 4.

Same as in the first embodiment, the present embodiment is intended for enabling a user who is under the environment of the intranet Y to print a file stored in the PC 2 connected to the internal network 6a of the intranet X at a remote site on a printer 3b connected to the internal network 6b of the intranet Y using the cellular phone 1b. The points where the present embodiment is different from the first embodiment are that the cellular phone 1b establishes connections with the PC 2 via a public network 9 and a public network-authenticating server 8 connected to the internal network 6a inside the intranet X, and that the cellular phone 1b transfers the URL of the uploading destination of the printer job to the printer 3b via a local communication circuit. Therefore, all other devices in the present embodiment have the same constitutions and functions and are in the same connection conditions as in the first embodiment.

Figure 10:
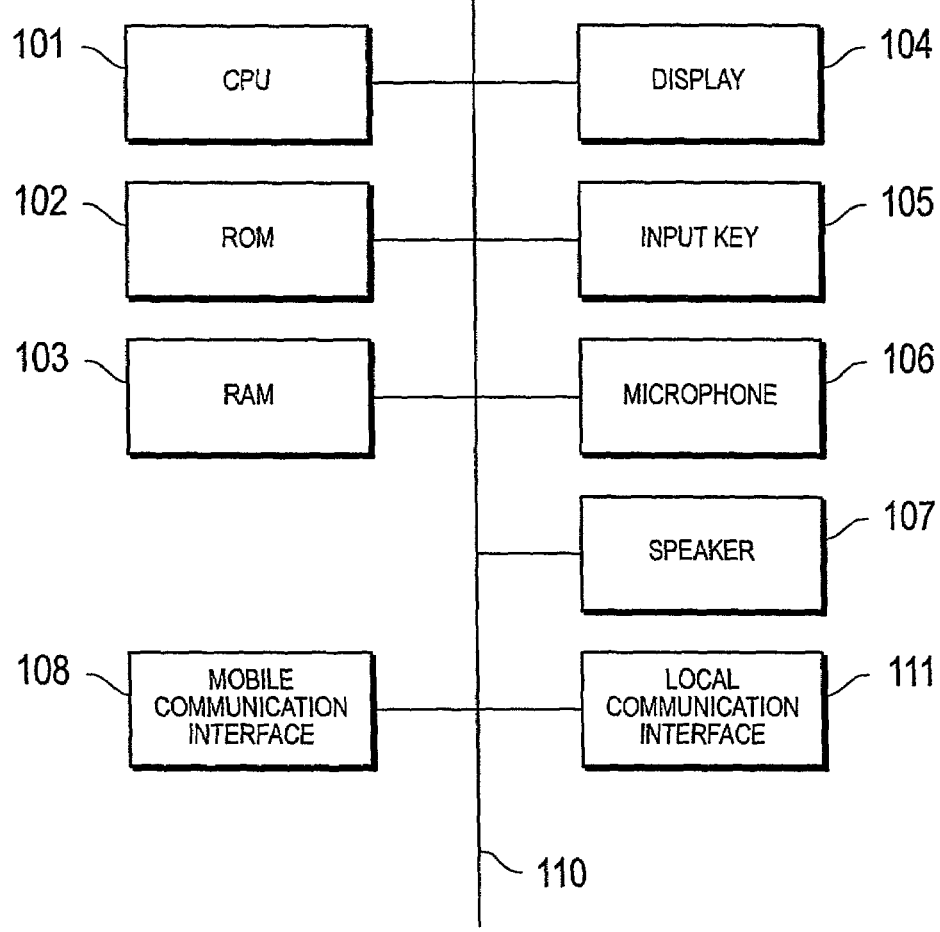
FIG. 10 is a block diagram showing an example structure of a cellular phone 1b in FIG. 9.

FIG. 10 is a block diagram showing the structure of the cellular phone 1b in the present embodiment. In FIG. 10, the cellular phone 1b contains a CPU 101, a ROM 102, a RAM 103, a display 104, an input key 105, a microphone 106, a speaker 107, a mobile communication interface 108, a local communication interface 111, and a bus 110.

The local communication interface 111 is an interface for exchanging local communications with the printer 3a. The local communication means communications conducted in relatively short distances (preferably less than 100 m; more preferably less than 10 m) without relying on the use of a network and includes both wired communications through cables and wireless communications using radio waves and infrared rays. The local communication examples useful in the present embodiment include those using serial interfaces such as RS-232C, IEEE1394 and USB and those using parallel interfaces such as IEEE1284 as the wired types; and those that are based on the wireless communication standards, such as, Bluetooth, IEEE802.11, Home RF, IrDA, etc., as the wireless types.

Figure 11:
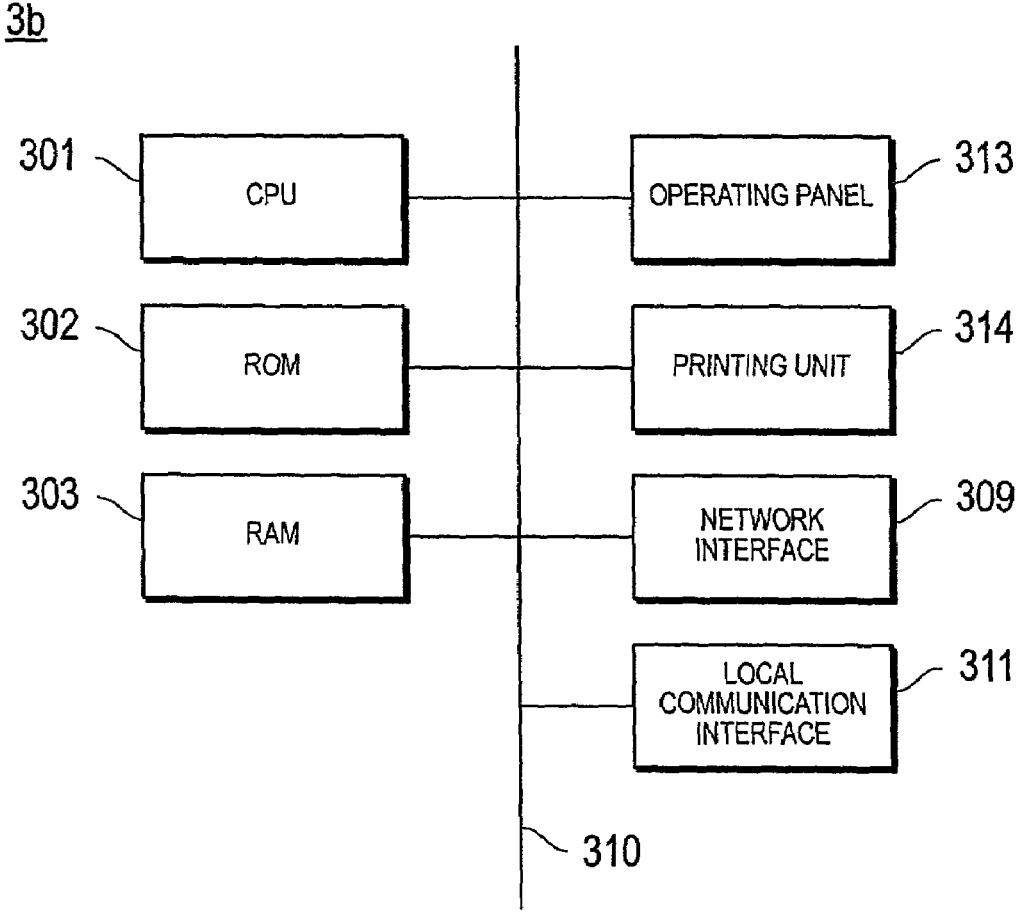
FIG. 11 is a block diagram showing an example structure of a printer 3b in FIG. 9.

FIG. 11 is a block diagram showing the constitution of the printer 3b in the present embodiment. In FIG. 11, the printer 3b contains a CPU 301, a ROM 302, a RAM 303, an operating panel 313, a printing unit 314, a network interface 309, a local communication interface 311, and a bus 310.

The local communication interface 311 is an interface for communicating with the cellular phone 1b and it is possible to use a unit similar to the local communication interface 111 in order to be a match with the local communication interface 111 of the cellular phone 1b. In the present embodiment, the cellular phone 1a and the printer 3b are assumed to be in a communicable state via the local communication interface 111 and 311 in preparation for the printing process.

The public network 9 includes a telephone network, an ISDN, a data communication network such as a packet network, etc. Also, in case of the cellular phone 1b, where a connection is made from the mobile communication interface 108 to the nearest base station by means of wireless communication and further to a telephone network, etc., via a mobile communication network, the public network 9 includes the mobile communication network that includes such base station.

The public network authentication server 8 consists of a computer or dedicated hardware of some kind, which is capable of conducting connection authentication for the connection request from the public network 9.

Figure 12:
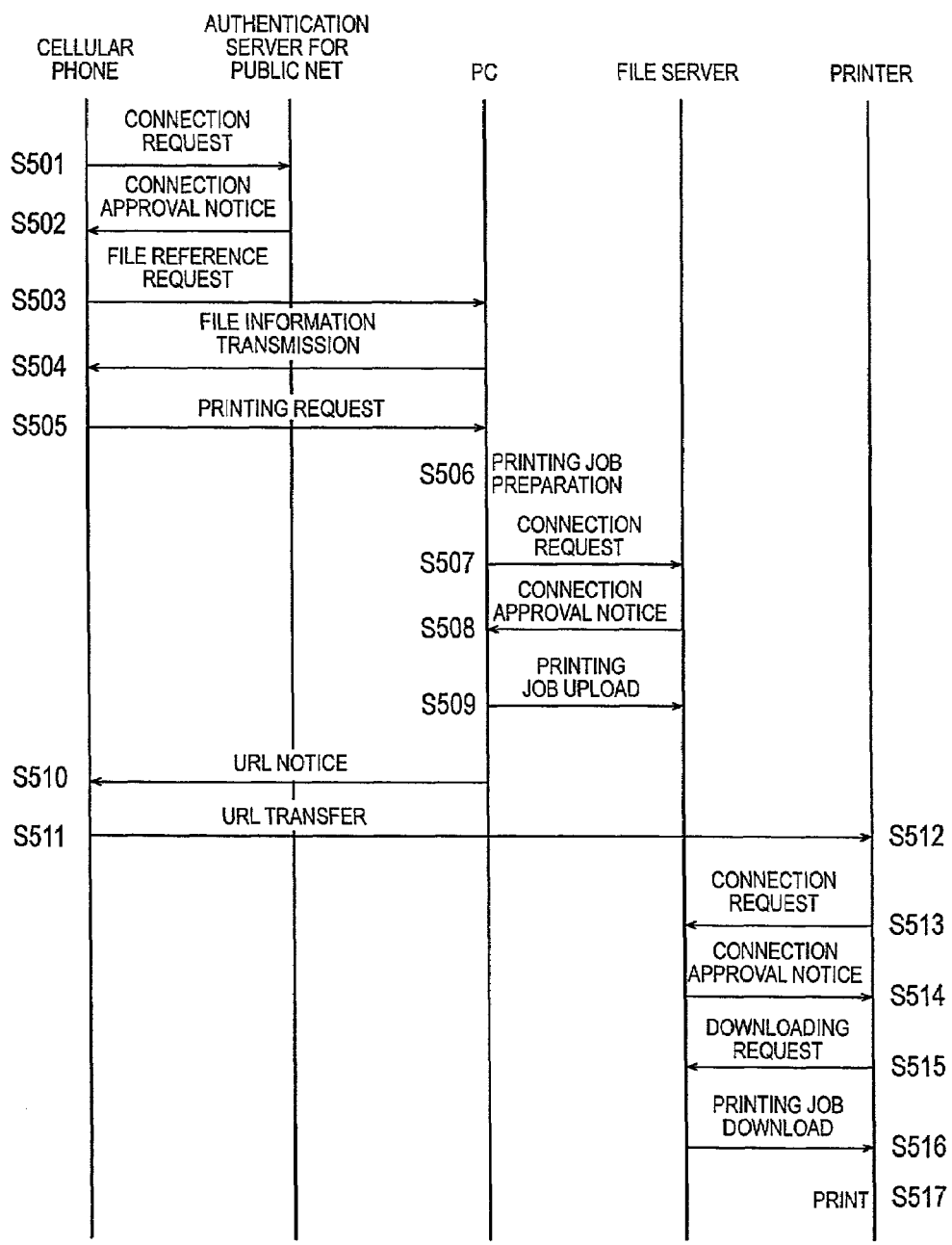
FIG. 12 is a sequence chart showing the printing procedure of a printing system in FIG. 9.

Next, the outline of the operation of the image processing system of the present embodiment will be described below using the sequence chart shown in FIG. 12.

Based on the user's connection instruction, the cellular phone 1b sends a connection request to the public network authentication server 8 via the public network 9 (S501) to receive a connection request from the public network authentication server 8 (S502). Thus, the cellular phone 1b establishes a connection to the PC 2 via the public network 9, the public network authentication server 8, and the internal network 6a.

When the connection from the cellular phone 1b to the PC 2 is established, the cellular phone 1b sends a file reference request to the PC 2 (S503), and receives the file information from the PC 2 (S504). Next, the cellular phone 1b sends a print request for the specified file to the PC 2 (S505).

The PC 2 prepares the printing job for the file specified based on the received printing request (S506). Next, the PC 2 sends a connection request to the file server 4 (S507), and the connection from the PC 2 to the file server 4 is established as the connection approval notice is received from the file server 4 (S508). The connection from the PC 2 to the file server 4 is conducted by a protocol, which is allowed to make connections only from the internal network to the external network at the firewall 5a.

When the connection from the PC 2 to the file server 4 is established, the PC 2 uploads the prepared printing job to the file server 4 (S509), and notifies the cellular phone 1b of the uploading destination URL when the uploading is completed (S510).

When it receives the URL of the uploading destination of the printing job from the PC 2, the cellular phone 1b transfers the URL it received to the printer via the local communication channel (S511).

When it receives said URL from the cellular phone 1b via the local communication channel (S512), the printer 3b sends a connection request to the file server 4 (S513), and the connection from the printer 3b to the file server 4 is established as the connection approval notice is received from the file server 4 (S514). The connection from the printer 3b to the file server 4 is conducted by a protocol, which is allowed to make connections only from the internal network to the external network at the firewall 5b.

When the connection from the printer 3b to the file server 4 is established, the printer 3b sends a downloading request for said printing job to the file server 4 based on said URL (S515), and downloads said printing job stored in the file server 4 (S516). Next, the printer 3a conducts the printing process based on the downloaded printing job (S517).

Next, the operations of the cellular phone 1b, the public network authentication server 8, the PC 2 and the printer 3b in the present embodiment will be described in detail.

Figure 13B:
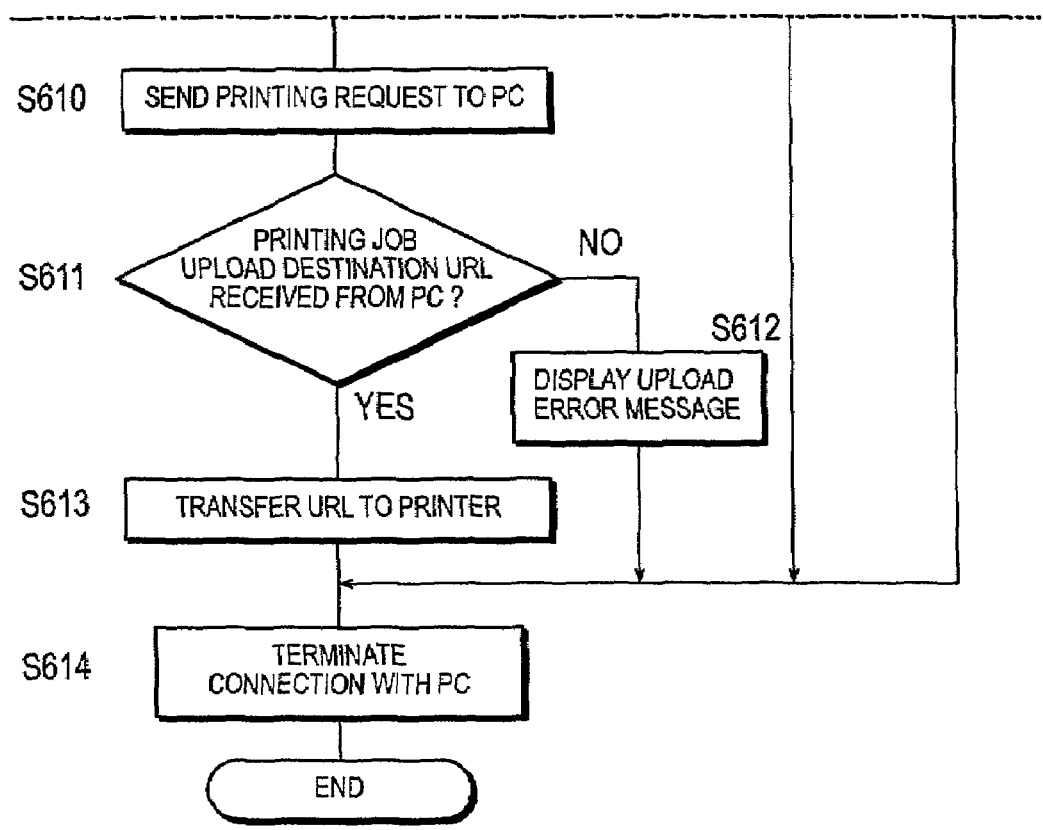
FIG. 13 is a flowchart showing the printing procedure of the cellular phone 1b in FIG. 9.

FIG. 13 is a flowchart showing the procedure of the printing process for the cellular phone 1b in the present embodiment. The cellular phone 1b goes on stand-by until the user's printing instruction is received (S601: No), and transmits the connection request to the public network authentication server 8 via the public network 9 (S602) when it receives the instruction for connection to the PC 2 from the user (S601: Yes).

If it fails to receive a connection approval notice from the PC 2 such that there is no response from the PC 2 within a specified time after sending said connection request or that a connection rejection notice is received from the PC 2 (S603: No), a connection error message will be displayed on the display 104 (S604) and the attempt of connecting with the public network authentication server 8 will be terminated (S614). If a connection approval notice is received from the public network authentication server 8 (S603: Yes), a file reference request will be sent out in order to make reference to the files stored in the hard disk 211 of the PC 2 (S605). If it fails to receive the file information from the PC 2 such that a response is not received from the PC 2 within a specified time after a file reference request is made (S606: No), a file reference error message will be displayed on the display 104 (S607), and the connection with the PC 2 will be terminated (S614). When file information is received from the PC 2 (S606: Yes), the received file information will be displayed on the display 104 (S608).

Next, the cellular phone 1*a* will be on stand-by until the printing instruction is received from the user (S609: No), and when a printing instruction is received from the user (S609: Yes), a printing request will be sent to the PC 2 (S610).

If it fails to receive the URL of the uploading destination of the printer job from the PC 2 to the file server 4 such that a response is not received from the PC 2 within a specified time after a printing request is made or that a printing job upload error notice is received (S611: No), a printing job upload error message will be displayed on the display 104 (S612), and the connection with the PC 2 will be terminated (S614). When the URL of the uploading destination of the printer job from the PC 2 to the file server 4 is received from the PC 2 (S611: Yes), the received URL will be transferred to the printer 3*b* via a local communication line such as Bluetooth (S613), and the connection with the PC 2 will be terminated (S614).

Figure 14:
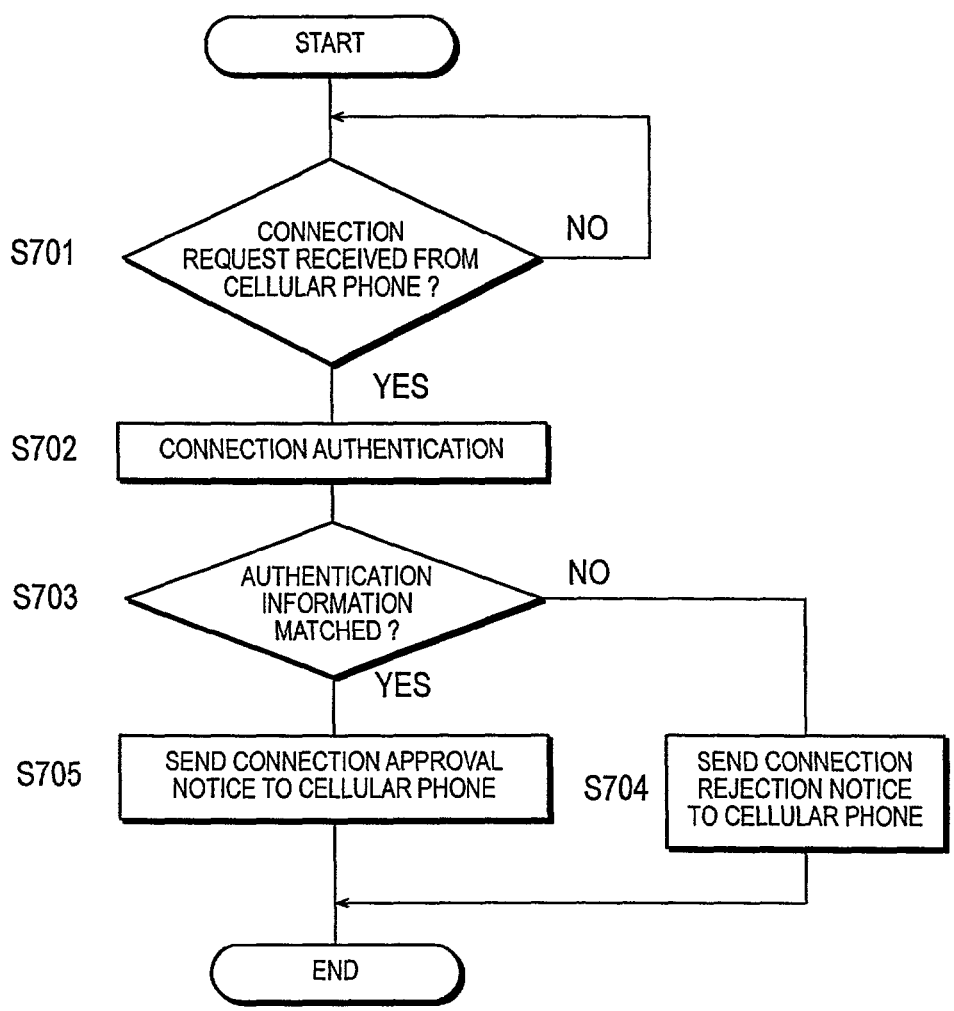
FIG. 14 is a flowchart showing the printing procedure of a public network-authenticating server 8 in FIG. 9.

FIG. 14 is a flowchart showing the printing procedure of a public network-authenticating server 8 in the present embodiment. The public network-authenticating server 8 goes on stand-by until a connection request is received from the cellular phone 1*b* (S701: No) and conducts connection authentication (S702) based on the authentication information contained in the connection request as it is received from the cellular phone 1*b* (S701: Yes). If the authentication information does not match (S703: No), a connection rejection notice will be sent to the cellular phone (S704); if the authentication information matches (S703: Yes), a connection approval notice will be sent to the cellular phone 1*b* (S705).

Figure 15A:
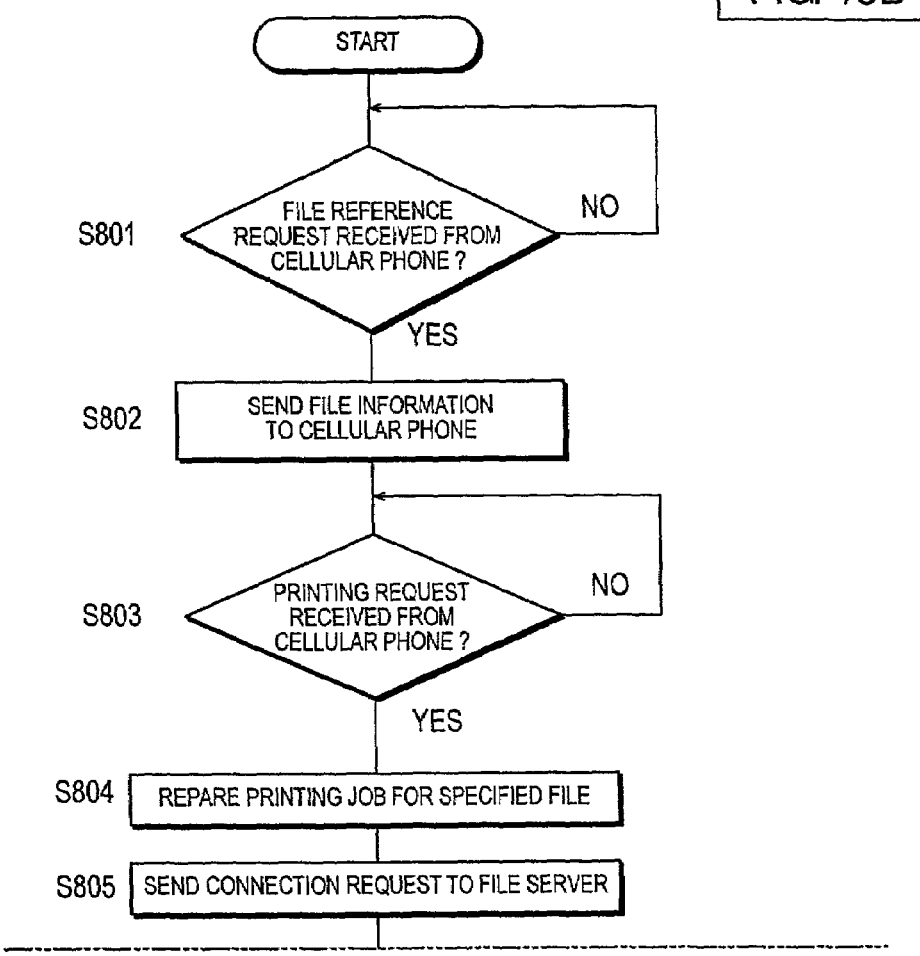
FIG. 15 is a flowchart showing the printing procedure of the personal computer 2 in FIG. 9.
Figure 15B:
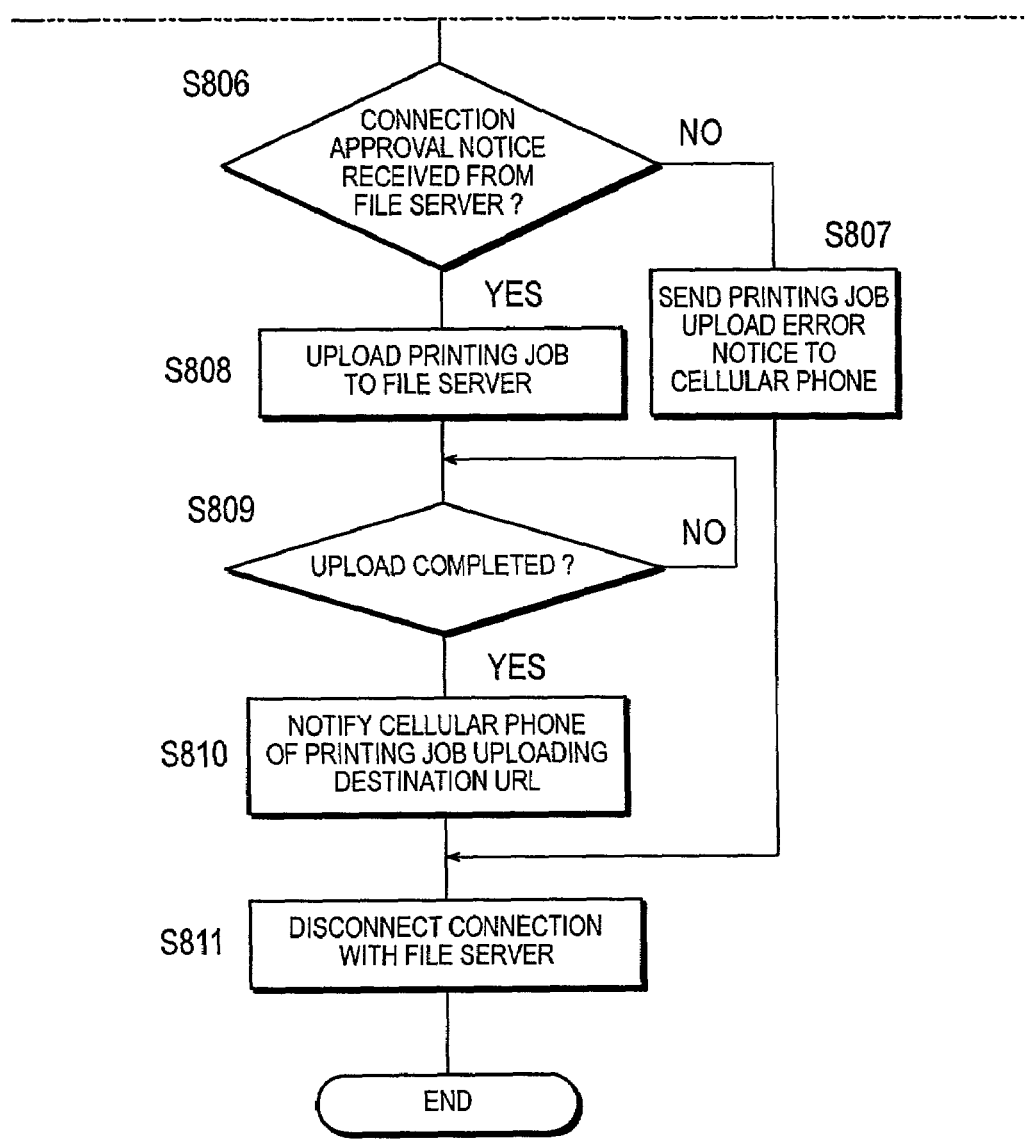

FIG. 15 is a flowchart showing the printing procedure of the PC 2. The PC 2 goes on stand-by until a file reference request is received from the cellular phone 1*b* (S801: No). When it receives a file reference request from the cellular phone 1*b* (S801: Yes), it prepares file information containing the names of the files of all the files stored in the hard disk for which printing jobs can be prepared as well as the structures of the directories where said files are stored, and sends said file information to the cellular phone 1*b* (S802).

Next, the PC 2 goes on stand-by until a printing request is received from the cellular phone 1*b* (S803: No). When it receives a printing request from the cellular phone 1*b* (S803: Yes), it prepares a printing job for the file specified in the received printing request (S804).

Next, a connection request is sent to the file server 4 using a protocol such as FTP or HTTP that is allowed to connect only from the internal network to the external network at the firewall 5*a* (S805). If it fails to receive a connection approval notice from the file server 4 such that there is no response from the file server 4 within a specified time after sending said connection request or that a connection rejection notice is received from the file server 4 (S806: No), a printing job upload error notice will be sent to the cellular phone 1*b* (S807), and the attempt of connecting with the file server 4 will be terminated (S811). If a connection approval notice is received from the file server 4 (S806: Yes), the prepared printing job will be uploaded to the file server 4 (S808).

When the uploading of the printing job to the file server 4 is completed (S809: Yes), the URL of the uploading destination will be sent to the cellular phone 1*b* (S807), and the connection with the file server 4 will be terminated (S811).

Figure 16:
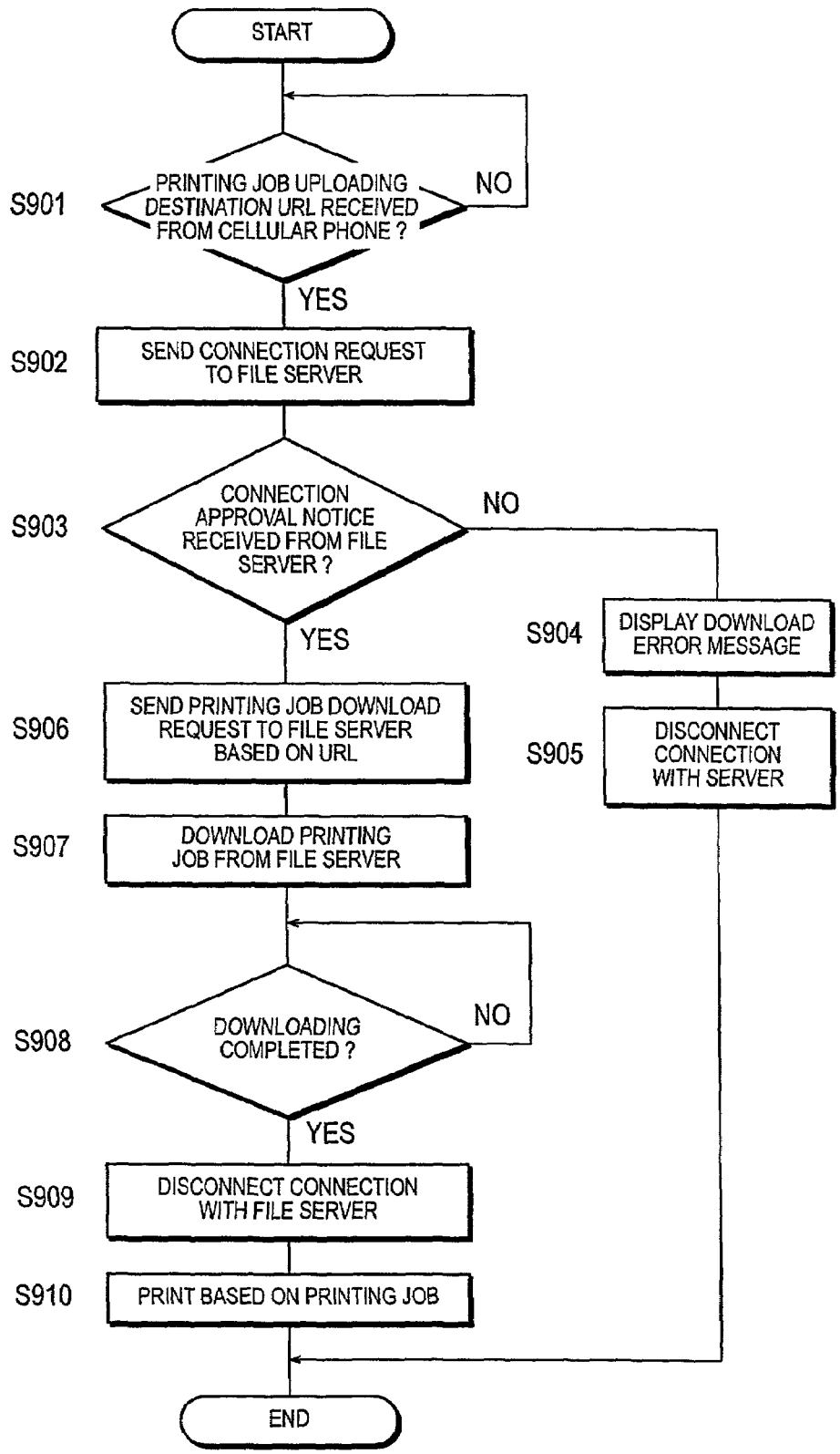
FIG. 16 is a flowchart showing the printing procedure of the printer 3b in FIG. 9.

FIG. 16 is a flowchart showing the operation of the printer 3*b* in the present embodiment. The printer 3*b* goes on stand-by until it receives a URL of the printing job uploading destination from the cellular phone 1*b* via a local communication circuit (S901: No). When said URL is received from the cellular phone 1*b* (S901: Yes), a connection request is sent to the file server 4 using a protocol that is allowed to connect only from the internal network to the external network at the firewall 5*b* (S902). If it fails to receive a connection approval notice from the file server 4 such that there is no response from the file server 4 within a specified time after sending said connection request or that a connection rejection notice is received from the file server 4 (S903: No), a printing job upload error notice will be displayed on the operating panel 313 (S904), and the attempt of connecting with the file server 4 will be terminated (S905). If a connection approval notice is received from the file server 4 (S903: Yes), said printing job download request will be sent to the file server 4 based on said URL (S906), and the prepared printing job will be downloaded from the directory on the file server 4 where said printing job is stored as indicated by said URL (S907).

When the downloading of the printing job to the file server 4 is completed (S908: Yes), the connection with the file server 4 will be terminated (S909) and the printing process will be executed based on the downloaded printing job (S910).

Although it was described in the above that the second embodiment is so constituted that, when the cell phone 1*b* receives the printing job upload destination URL, the received URL is automatically transferred to the printer 3*b* (S511, S613 and S901), it can also be so constituted that, when said URL is received from the PC 2, the received URL is first displayed on the display unit 104 and then transferred to the printer 3*b* when a transfer instruction is received from the user.

Further, although it was described in the above that the second embodiment is so constituted that the cellular phone 1*b* transfers said URL it received to the printer 3*b* via a local communication circuit to the printer 3*b* (S511, S613 and S901), it can also be so constituted that the cellular phone 1*b* is constituted in a similar way having a similar network interface 109 as the cellular phone 1*a* in the first embodiment so that the cellular telephone 1*b* transfers said URL it received via the internal network 6*b* to the printer 3*b*, or that the cellular phone 1*b* is constituted in a similar way as in the first embodiment to display said URL on the display 104 and that the user enters said URL from the operating panel 313 of the printer 3*b*. Also, the first embodiment can be constituted in such a way that that the cellular phone 1*a* transfers said URL it received to the printer 3*a* via the internal network 6*b*, or that the cellular phone 1*a* is equipped with the local communication interface 111 and the printer 3*a* is equipped with the local communication interface 311, thus allowing the cellular phone 1*b* to transfer said URL it received to the printer 3*b* via a local communication channel same as in the second embodiment.

Moreover, although the PC 2 is to deliver said URL to the cellular phone in said first and second embodiments (S110, S211, S315, S510, S611 and S810), a constitution is also possible wherein the file server 4 has a public network interface so that the file server 4 delivers said URL to the cellular phone 1*b* via the public network. In this case, the PC 2 transmits to the file server 4 the telephone number of the cellular phone to which the URL is to be delivered simultaneously with the uploading of said printing job (S509 and S808), so that the file server 4 notifies the cellular phone of the URL based on said telephone number it received at the same time when the uploading of said printing job is completed.

Moreover, regarding the first and second embodiments, the user can find the URL to be downloaded without being notified of said URL by defining in advance the protocol to be used, the directory of the uploading destination, the method of naming of the uploaded file, etc., when the PC 2 is uploading said printing job to the file server 4. In such a case, the first embodiment can be constituted without notification of the printing job uploading destination URL (S110, S111, S211-213 and S315). Also, the second embodiment can be constituted in such a way that the user enters said URL from the operating panel 313 eliminating the notification of the printing job uploading destination URL (S510, S611-613 and S810) as well as the procedures of transferring the URL from the cellular phone to the printer (S511 and S901).

Although the image processing system of the present invention was described in each of the embodiments mentioned in the above assuming a cellular phone as the portable terminal, a PC as the image forming data transmitting device, and a printer as the image forming device, the invention is not limited to such an assumption, but rather that the portable terminal can be various computers such as PHS®, PDA, laptop, electronic notebooks, etc. The image forming data transmitting device can be, in addition to various computers such as PCs, workstations, servers, etc., various multi-functional peripherals (MFP) with file storage functions or the like. Moreover, the image-forming device can be, in addition to printers, various multi-functional peripherals (MFP) such as digital copying machines, facsimile machines, etc., and various display devices, either standalone or devices connected to PCs, such as CRT displays, liquid crystal displays, projectors, etc.

Various means that constitute various devices on the image processing system according to the present invention and related image processing methods can be embodied either by dedicated hardware circuits or the abovementioned devices operating under certain programs. In embodying the present invention using the abovementioned devices under certain programs, the programs that operate the devices can be provided by computer readable recording media (e.g., floppy disks, CD-ROMs, etc.). The programs recorded on those computer readable recording media are normally transferred to hard disks to be stored. Such a program can be used either as a standalone program or can be built into the software of a particular device as a portion of various functions of the device.

As can be seen from the above descriptions, the present invention enables one to conduct image forming of a file stored in an image forming data transmitting device on a first intranet on an image-forming device on a second intranet without being hindered by firewalls using a portable terminal and a file server on an external network.

The present invention allows a person on a business trip to print or view a file out of various files stored in the person's PC from a printer or on a monitor at the person's trip destination by simply carrying a portable terminal such as a cellular phone.

In particular, a person can transfer, print, etc., a desired file stored in the person's own computer to a printer at the person's trip destination via an external network such as the Internet without changing the existing settings of any firewalls and maintaining the protective functions of the firewalls.

What is claimed is:

1. An image processing method for printing images on an image printing device based on a file stored in an image data transmission device using a portable terminal, said image data transmission device connected to a first internal network provided behind a first firewall, said image printing device connected to a second internal network provided behind a second firewall, and a file server connected to an external network provided outside of said first firewall and said second firewall, comprising:

said portable terminal establishing a connection with said image data transmission device via said second internal network, said second firewall, said external network, said first firewall and said first internal network, wherein establishing the connection comprises using a protocol which allows a first bi-directional connection between the first internal network and the external network and a second bi-directional connection between the second internal network and the external network;

said portable terminal transmitting an image printing request to said image data transmission device, wherein said image printing request identifies said stored file;

said image data transmission device receiving said image printing request and preparing a print job to print images associated with said stored file in response to said image printing request;

said image data transmission device establishing a connection with said file server via said first internal network, said first firewall, and said external network using a protocol which allows only uni-directional connections from the first internal network to the external network at said first firewall;

said image data transmission device uploading said prepared print job to said file server;

said file server transmitting a storage location data indicating where said print job uploaded by said image data transmission device is stored on said file server to said portable terminal, said portable terminal receiving said storage location data which said file server transmitted, said portable terminal transferring said received storage location data to said image printing device via said second internal network or a local communication circuit, said image printing device receiving said storage location data transferred by said portable terminal, said image printing device establishing a connection with said file server via said second internal network, said second firewall, and said external network using a protocol which allows only uni-directional connections from the second internal network to the external network at said second firewall;

said image printing device downloading said prepared print job from the storage location on said file server based on said storage location data; and said image printing device printing images based on said downloaded print job.

2. An image processing method according to claim 1 further comprising:

said portable terminal displaying said storage location data which said file server transmitted.

3. An image processing method according to claim 1 wherein said image printing device is a printer.

4. An image processing method for forming an image on an image printing device based on a file stored in an image data transmission device using a portable terminal, said image data transmission device connected to a first internal network constructed inside a first firewall, said image printing device connected to a second internal network constructed inside a second firewall, and a file server connected to an external network constructed on the outside of said first firewall and said second firewall, comprising:

said portable terminal establishing a connection with said image data transmission device via a public network, a public network authenticating server connected to said first internal network, and said first internal network;

said portable terminal transmitting an image printing request for said file stored in said image data transmission device to said image data transmission device;

said image data transmission device receiving said image printing request transmitted by said portable terminal and preparing an print job for said file according to said image printing request;

said image data transmission device establishing a connection with said file server via said first internal network, said first firewall, and said external network using a protocol, which allows connections only from the first internal network to the external network at said first firewall;

said image data transmission device uploads said prepared print job to said file server;

said file server transmitting a storage location data indicating where said print job uploaded by said image data transmission device is stored on said file server to said portable terminal, said portable terminal receiving said storage location data which said file server transmitted, said portable terminal transferring said received storage location data to said image printing device via said second internal network or a local communication circuit, said image printing device receiving said storage location data transferred by said portable terminal, said image printing device establishing a connection with said file server via said second internal network, said second firewall, and said external network using a protocol, which allows connections only from the second network to the external network at said second firewall;

said image printing device downloading said print job from the storage location on said file server based on said storage location data; and said image printing device forming said image based on said downloaded print job.

5. An image processing method according to claim 4 further comprising:

said portable terminal displaying said storage location data which said file server transmitted.

6. An image processing method according to claim 4 wherein said image printing device is a printer.

7. An image processing system for forming an image on an image printing device based on a file stored in an image data transmission device, using a portable terminal, said image data transmission device connected to a first internal network constructed inside a first firewall, said image printing device connected to a second internal network constructed inside a second firewall, and a file server connected to an external network constructed on the outside of said first firewall and said second firewall, wherein:

said portable terminal comprises, a first connection establisher to establish a connection with said image data transmission device via said second internal network, said second firewall, said external network, said first firewall and said first internal network using a protocol, which allows bi-directional connections between the first internal network and the external network at said first firewall and said second firewall, and an image printing request transmitter to transmit an image printing request for said file stored in said image data transmission device to said image data transmission device;

said image data transmission device comprises, an image printing request receiver to receive said image printing request from said portable terminal, an print job preparer to prepare an print job for said file based on said image printing request received by said image printing request receiver, a second connection establisher to establish a connection with said file server via said first internal network, said first firewall, and said external network using a protocol, which allows connections only from the first internal network to the external network at said first firewall, and a print job uploader to upload said print job prepared by said print job preparer to said file server; and said image printing device comprises, a third connection establisher to establish a connection with said file server via said second internal network, said second firewall, and said external network using a protocol, which allows connections only from the second internal network to the external network at said second firewall, a print job downloader to download said print job from said file server, and an image former to form said image based on said print job downloaded by said print job downloader, wherein said image processing system is so configured that said file server transmits a storage location data indicating where said print job uploaded by said print job uploader on said file server to said portable terminal, said portable terminal receives said storage location data which said file server transmitted, said portable terminal transfers said received storage location data to said image printing device via said second internal network or a local communication circuit, said image printing device receives said storage location data transferred by said portable terminal, and said print job downloader downloads said print job from the storage location on said file server based on said storage location data.

8. An image processing system according to claim 7 wherein said image printing device is a printer.

9. An image processing system for forming an image on an image printing device based on a file stored in an image data transmission device, using a portable terminal, said image data transmission device connected to a first internal network constructed inside a first firewall, said image printing device connected to a second internal network constructed inside a second firewall, and a file server connected to an external network constructed on the outside of said first firewall and said second firewall, wherein said portable terminal comprises, a first connection establisher to establish a connection with said image data transmission device via a public network, a public network authenticating server connected to said first internal network, and said first internal network, and an image printing request transmitter to transmit an image printing request for said file stored in said image data transmission device to said image data transmission device;

said image data transmission device comprises, an image printing request receiver to receive said image printing request from said portable terminal, a print job preparer to prepare a print job for said file based on said image printing request received by said image printing request receiving means, a second connection establisher to establish a connection with said file server via said first internal network, said first firewall, and said external network using a protocol, which allows connections only from the first network to the external network at said first firewall, and a print job uploader to upload said print job prepared by said print job preparing means to said file server; and said image printing device comprises, a third connection establisher to establish a connection with said file server via said second internal network, said second firewall, and said external network using a protocol, which allows connections only from the second internal network to the external network at said second firewall, a print job downloader to download said print job from said file server, and an image former to form said image based on said print job downloaded by said print job downloader, wherein said image processing system is so configured that said file server transmits a storage location data indicating where said print job uploaded by said print job uploader is stored on said file server to said portable terminal, said portable terminal receives said storage location data which said file server transmitted, said portable terminal transfers said received storage location data to said image printing device via said second internal network or a local communication circuit, said image printing device receives said storage location data transferred by said portable terminal, and said print job downloader downloads said print job from the storage location on said file server based on said storage location data.

10. An image processing system according to claim 9 wherein said image printing device is a printer.

11. A portable terminal for forming an image on an image printing device based on a file stored in an image data transmission device, using said portable terminal, said image data transmission device connected to a first internal network constructed inside a first firewall, said image printing device connected to a second internal network constructed inside a second firewall, and a file server connected to an external network constructed on the outside of said first firewall and said second firewall, comprising:

a connection establisher to establish a connection with said image data transmission device via said second internal network, said second firewall, said external network, said first firewall and said first internal network using a protocol, which allows bi-directional connections between the first network and the external network at said first firewall and said second firewall; and an image printing request transmitter to transmit an image printing request for said file stored in said image data transmission device to said image data transmission devices, wherein said portable terminal is so configured as to receive a storage location data transmitted by said file server and indicating where a print job uploaded by said image data transmission device is stored on said file server and as to transfer said received storage location data to said image printing device via said second internal network or a local communication circuit.

12. A portable terminal according to claim 11 further comprising:

a storage location data display to display said received storage location data.

13. A portable terminal according to claim 11 wherein said image printing device is a printer.

14. A portable terminal for forming an image on an image printing device based on a file stored in an image data transmission device, using said portable terminal, said image data transmission device connected to a first internal network constructed inside a first firewall, said image printing device connected to a second internal network constructed inside a second firewall, and a file server connected to an external network constructed on the outside of said first firewall and said second firewall, comprising:

a connection establisher to establish a connection with said image data transmission device via a public network, a public network authenticating server connected to said first internal network, and said first internal network; and an image printing request transmitter to transmit an image printing request for said file stored in said image data transmission device to said image data transmission devices, wherein said portable terminal is so configured as to receive a storage location data transmitted by said file server and indicating where a print job uploaded by said image data transmission device is stored on said file server and as to transfer said received storage location data to said image printing device via said second internal network or a local communication circuit.

15. A portable terminal according to claim 14 further comprising:

a storage location data display to display said received storage location data received.

16. A portable terminal according to claim 11 wherein said image printing device is a printer.

17. An image printing device for forming an image based on a file stored in an image data transmission device, using a portable terminal, said image data transmission device connected to a first internal network constructed inside a first firewall, said image printing device connected to a second internal network constructed inside a second firewall, and a file server connected to an external network constructed on the outside of said first firewall and said second firewall, comprising:

a connection establisher to establish a connection with said file server via said second internal network, said second firewall, and said external network using a protocol, which allows connections only from the second internal network to the external network at said second firewall;

a print job downloader to download from said file server a print job for said file uploaded by said image data transmission device to said file server; and an image printing device to form said image based on said print job downloaded by said print job downloader, wherein said printing device is so configured as to receive a storage location data transferred by said portable terminal and indicating where a print job uploaded by said print job uploader is stored on said file server, said storage location data being transmitted to said portable terminal by said file server.

18. An image printing device according to claim 17 wherein said print job downloader downloads said print job from the storage location on said file server based on said received storage location data.

19. An image printing device according to claim 17 wherein said image printing device is a printer.

20. A recording medium that stores a program to control a portable terminal for forming an image on an image printing device based on a file stored in an image data transmission device, using said portable terminal, said image data transmission device connected to a first internal network constructed inside a first firewall, said image printing device connected to a second internal network constructed inside a second firewall, and a file server connected to an external network constructed on the outside of said first firewall and said second firewall, characterized in causing said portable terminal to execute:
   establishing a connection with said image data transmission device via said second internal network, said second firewall, said external network, said first firewall and said first internal network using a protocol, which allows bi-directional connections between the first internal network and the external network at said first firewall and said second firewall,
   transmitting an image printing request for said file stored in said image data transmission device to said image data transmission device,
   receiving a storage location data transmitted by said file server and indicating where a print job uploaded by said image data transmission device is stored on said file server, and
   transferring said received storage location data to said image printing device via said second internal network or a local communication circuit.

21. A recording medium that stores a program to control a portable terminal for forming an image on an image printing device based on a file stored in an image data transmission device, using said portable terminal, said image data transmission device connected to a first internal network constructed inside a first firewall, said image printing device connected to a second internal network constructed inside a second firewall, and a file server connected to an external network constructed on the outside of said first firewall and said second firewall, characterized in causing said portable terminal to execute:
   establishing a connection with said image data transmission device via a public network, a public network authenticating server connected to said first internal network, and said first internal network,
   transmitting an image printing request for said file stored in said image data transmission device to said image data transmission device,
   receiving a storage location data transmitted by said file server and indicating where a print job uploaded by said image data transmission device is stored on said file server, and
   transferring said received storage location data to said image printing device via said second internal network or a local communication circuit.

22. A recording medium that stores a program to control an image printing device for forming an image based on a file stored in an image data transmission device, using a portable terminal, said image data transmission device connected to a first internal network constructed inside a first firewall, said image printing device connected to a second internal network constructed inside a second firewall, and a file server connected to an external network constructed on the outside of said first firewall and said second firewall, characterized in causing said image printing device to execute:
   establishing a connection with said file server via said second internal network, said second firewall and said external network using a protocol, which allows connections only from the second internal network to the external network at said second firewall;
   downloading from said file server a print job for said file uploaded by said image data transmission device to said file server;
   printing based on said print job;
   receiving a storage location data transferred by said file server and indicating where a print job uploaded by said image data transmission device is stored on said file server.

23. A remote printing method, comprising:
   providing a first network comprising an image storage device and a first firewall, the image storage device being provided behind the first firewall;
   providing a second network comprising a printing device and a second firewall, the printing device being provided behind the second firewall;
   providing an external network comprising a file server;
   storing an image file in the image storage device;
   forming a bi-directional connection between a portable terminal and the image storage device, the bi-directional connection being formed through the second network, the second firewall, the external network, the first firewall and the first network;
   transmitting a file reference request from the portable terminal to the image storage device via the bi-directional connection;
   transmitting file image information from the image storage device to the portable device via the bi-directional connection in response to the file reference request;
   transmitting an image printing request from the portable terminal to the image forming device via the bi-directional connection, the image printing request comprising printing instructions;
   forming a print job at the image storage device in response to the image printing request;
   forming a first uni-directional connection between the image storage device and the file server through the first firewall;
   transmitting the print job from the image storage device to the file server via the first uni-directional connection;
   storing the print job in the file server;
   forming a second uni-directional connection between the file server and the printing device through the second firewall;
   transmitting the print job from the file server to the printing device via the second uni-directional connection;
   printing images using the printing device, the images being based on the print job, wherein
   said file server transmits a storage location data indicating where said print job is stored on said file server to said portable terminal,
   said portable terminal receives said storage location data which said file server transmitted, said portable terminal transfers said received storage location data to said printing device via said second internal network or a local communication circuit, said printing device receives said storage location data transferred by said portable terminal, and said printing device downloads said print job from said storage location on said file server based on said storage location data.

24. A remote printing system, comprising:

a first network comprising an image storage device and a first firewall, the image storage device being provided behind the first firewall and configured to store an image file;

a second network comprising a printing device and a second firewall, the printing device being provided behind the second firewall;

an external network comprising a file server; and a portable terminal;

wherein the system is configured to form a bi-directional connection between the portable terminal and the image storage device through the second network, the second firewall, the external network, the first firewall and the first network, such that a file reference request may be transmitted from the portable terminal to the image storage device via the bi-directional connection;

file image information may be transmitted from the image storage device to the portable device via the bi-directional connection in response to the file reference request; and an image printing request may be transmitted from the portable terminal to the image forming device via the bi-directional connection, the image printing request comprising printing instructions;

wherein the image storage device is configured to form a print job at in response to the image printing request;

wherein the system is further configured to form a first uni-directional connection between the image storage device and the file server through the first firewall and to transmit the print job from the image storage device to the file server via the first uni-directional connection;

wherein the file server is configured to store the print job;

wherein the system is further configured to form a second uni-directional connection between the file server and the printing device through the second firewall and to transmit the print job from the file server to the printing device via the second uni-directional connection;

wherein the printing device is configured to print images based on the print job;

wherein said file server is configured to transmit a storage location data indicating where said print job is stored on said file server to said portable terminal, wherein said portable terminal is configured to receive said storage location data which said file server transmitted, wherein said portable terminal is configured to transfer said received storage location data to said printing device via said second internal network or a local communication circuit, wherein said printing device is configured to receive said storage location data transferred by said portable terminal, and wherein said printing device is configured to download said print job from said storage location on said file server based on said storage location data.

* * * * *